(12) United States Patent
Yoshida

(10) Patent No.: US 11,941,370 B2
(45) Date of Patent: Mar. 26, 2024

(54) ARITHMETIC APPARATUS AND MULTIPLY-ACCUMULATE SYSTEM

(71) Applicant: Sony Group Corporation, Tokyo (JP)

(72) Inventor: Hiroshi Yoshida, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 181 days.

(21) Appl. No.: 17/426,078

(22) PCT Filed: Jan. 27, 2020

(86) PCT No.: PCT/JP2020/002669
§ 371 (c)(1),
(2) Date: Jul. 27, 2021

(87) PCT Pub. No.: WO2020/162241
PCT Pub. Date: Aug. 13, 2020

(65) Prior Publication Data
US 2022/0100470 A1 Mar. 31, 2022

(30) Foreign Application Priority Data

Feb. 4, 2019 (JP) ................................. 2019-018103

(51) Int. Cl.
*G06F 7/523* (2006.01)
*G06F 7/50* (2006.01)
(Continued)

(52) U.S. Cl.
CPC ................ *G06F 7/523* (2013.01); *G06F 7/50* (2013.01); *G06F 17/14* (2013.01); *G06G 7/16* (2013.01); *G06N 3/063* (2013.01)

(58) Field of Classification Search
CPC .......... G06F 7/50; G06F 7/523; G06F 7/5443; G06F 17/153; G06F 17/16; G06N 3/065;
(Continued)

(56) References Cited

U.S. PATENT DOCUMENTS 4,750,144 A 6/1988 Wilcox
9,779,355 B1 * 10/2017 Leobandung ............ G06N 3/04
(Continued)

FOREIGN PATENT DOCUMENTS

CN 1867888 A 11/2006
CN 102273078 A 12/2011
(Continued)

OTHER PUBLICATIONS

M. Yamaguchi et al., An Energy-efficient Time-domain Analog CMOS BinaryConnect Neural Network Processor Based on a Pulse-width Modulation Approach, IEEE Access Multidisciplinary Rapid Review Open Access Journal, 2017 (Year: 2017).*

(Continued)

*Primary Examiner* — Emily E Larocque
(74) *Attorney, Agent, or Firm* — Michael Best & Friedrich LLP

(57) ABSTRACT

An arithmetic apparatus includes input lines and multiply-accumulate devices. An electrical signal for an input value is input into each of the input lines. Multiplication units include a positive weight multiplication unit that generates a positive weight charge for a product value obtained by multiplying the input value by a positive weight value and/or a negative weight multiplication unit that generates a negative weight charge for a product value obtained by multiplying the input value by a negative weight value. An output unit of the multiply-accumulate device includes an accumulation unit that accumulates the positive weight charge and the negative weight charge, generates a voltage signal representing a sum of the product values by a voltage on the basis of the voltage of the accumulation unit, and outputs the multiply-accumulate signal on the basis of the voltage signal.

15 Claims, 16 Drawing Sheets

(51) Int. Cl.
*G06F 17/14* (2006.01)
*G06G 7/16* (2006.01)
*G06N 3/063* (2023.01)

(58) Field of Classification Search
CPC . G06N 3/049; G06G 7/14; G06G 7/16; G11C 11/54
See application file for complete search history.

(56) References Cited

U.S. PATENT DOCUMENTS

| | | |
|---|---|---|
| 2005/0160130 A1 | 7/2005 | Korekado |
| 2018/0253643 A1* | 9/2018 | Buchanan ............. G06F 7/5443 |
| 2019/0171418 A1* | 6/2019 | Morie ..................... G06G 7/16 |
| 2021/0384193 A1* | 12/2021 | Kimura ................ G11C 11/401 |
| 2022/0004853 A1* | 1/2022 | Shibata ................ G11C 13/003 |

FOREIGN PATENT DOCUMENTS

| | | |
|---|---|---|
| EP | 789312 A1 | 8/1997 |
| JP | 2011055588 A | 3/2011 |
| JP | 2012049040 A | 3/2012 |
| WO | 2018/034163 A1 | 2/2018 |
| WO | 2018/168293 A1 | 9/2018 |
| WO | 2018/235449 A1 | 12/2018 |

OTHER PUBLICATIONS

International Search Report (PCT/ISA/210), International Application No. PCT/JP2020/002669, dated Mar. 13, 2020.
Notification of Transmittal of the International Search Report and the Written Opinion of the International Searching Authority, or the Declaration (PCT/ISA/220), International Application No. PCT/JP2020/002669, dated Mar. 24, 2020.
Written Opinion of the International Search Authority (PCT/ISA/237), International Application No. PCT/JP2020/002669, dated Mar. 24, 2020.
Liao Chen, et al; Parallel 3D electromagnetic PIC simulation based on OpenMP; (School of Physical Electronics, University of Electronic Science and Technology of China, Chengdu 610054, China).

* cited by examiner

Input period

A

B

A

B

ARITHMETIC APPARATUS AND MULTIPLY-ACCUMULATE SYSTEM

TECHNICAL FIELD

The present technology relates to an arithmetic apparatus and a multiply-accumulate system that can be applied to a multiply-accumulate operation using an analog method.

BACKGROUND ART

Conventionally, a technology for performing a multiply-accumulate operation has been developed. The multiply-accumulate operation is an operation of multiplying each of a plurality of input values by a weight and adding the multiplication results to each other, and is used for, for example, processing of recognizing images, voices, and the like through a neural network or the like.

For example, Patent Literature 1 describes an analog circuit in which multiply-accumulate processing is performed in an analog manner. In this analog circuit, a weight corresponding to each of a plurality of electrical signals is set. Moreover, charges depending on the corresponding electrical signals and weights are respectively output and the output charges are accumulated in a capacitor as appropriate. A value to be calculated, which represents a multiply-accumulate result, is calculated on the basis of the voltage of the capacitor in which the charges are accumulated. Accordingly, it is possible to reduce the power consumption required for the multiply-accumulate operation as compared with, for example, digital processing (paragraphs [0003], [0049] to [0053], and [0062] of specification, FIG. 3, and the like of Patent Literature 1).

CITATION LIST

Patent Literature

Patent Literature 1: WO 2018/034163

DISCLOSURE OF INVENTION

Technical Problem

The use of such an analog-type circuit is expected to lead to low power consumption of the neural network or the like, and it is desirable to provide a technology capable of simplifying the circuit configuration and reducing the power consumption of the multiply-accumulate operation.

In view of the above-mentioned circumstances, it is an object of the present technology to provide an arithmetic apparatus and a multiply-accumulate system, by which the circuit configuration can be simplified and the power consumption of the multiply-accumulate operation can be reduced.

Solution to Problem

In order to accomplish the above-mentioned object, an arithmetic apparatus according to an embodiment of the present technology includes a plurality of input lines and a plurality of multiply-accumulate devices.

An electrical signal corresponding to an input value is input into each of the plurality of input lines within a predetermined input period.

The plurality of multiply-accumulate devices each includes a plurality of multiplication units that each generates, on the basis of the electrical signal input into each of the plurality of input lines, a charge corresponding to a product value obtained by multiplying the input value by a weight value, and an output unit that accumulates a charge corresponding to the product value generated by each of the plurality of multiplication units and outputs, on the basis of the accumulated charge, a multiply-accumulate signal representing a sum of the product values, in which the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a ratio of a sum total of the positive weight values to a sum total of absolute values of the weight values is any ratio of 0% to 100%, and the output unit includes an accumulation unit capable of accumulating each of the positive weight charge and the negative weight charge, generates a voltage signal representing a sum of the product values by a voltage on the basis of the voltage of the accumulation unit, and outputs the multiply-accumulate signal on the basis of the voltage signal.

The plurality of multiply-accumulate devices is configured such that sum totals of absolute values of the weight values of the plurality of multiplication units that the plurality of multiply-accumulate devices respectively includes are equal to each other.

With this arithmetic apparatus, in the plurality of multiply-accumulate devices, the positive weight charges and negative weight charges corresponding to the product values of the input values and the positive and negative weight values are accumulated at the accumulation units, and the voltage signals each representing the sum of the product values by the voltage are each generated on the basis of the voltage of the accumulation unit. Moreover, the sum totals of the absolute values of the weight values of the respective multiply-accumulate devices are set to be equal to each other. Accordingly, the distortion of the voltage signal is reduced, and the multiply-accumulate operation can be properly performed. Thus, it is possible to simplify the circuit configuration and to reduce the power consumption of the multiply-accumulate operation by using the voltage signal.

The accumulation unit may include a positive weight accumulation unit that accumulates the positive weight charge and a negative weight accumulation unit that accumulates the negative weight charge. In this case, the output unit may generate the voltage signal on the basis of a differential voltage between a positive weight voltage retained by the positive weight accumulation unit and a negative weight voltage retained by the negative weight accumulation unit.

The output unit may generate the voltage signal by amplifying the differential voltage at a predetermined amplification factor.

The output unit may output the voltage signal representing the sum of the product values by a voltage as the multiply-accumulate signal representing the sum of the product values.

The output unit may convert the voltage signal into the multiply-accumulate signal representing the sum of the product values by using a timing or a pulse width in a predetermined output period.

The output unit may output the multiply-accumulate signal normalized within the output period on the basis of the voltage signal generated by each of the plurality of multiply-accumulate devices.

The arithmetic apparatus may further include a voltage supply unit that supplies a ramp voltage to the output unit of each of the plurality of multiply-accumulate devices. In this case, the output unit may output the multiply-accumulate signal by performing threshold determination of the ramp voltage by using the voltage of the voltage signal as a threshold value.

The output unit may output the multiply-accumulate signal on the basis of a timing at which the ramp voltage increases or decreases beyond the voltage of the voltage signal.

The arithmetic apparatus may further include a detection unit that detects a maximum voltage as a reference voltage out of the voltages of the voltage signals respectively generated by the plurality of multiply-accumulate devices. In this case, the power supply unit may set a slope of the ramp voltage on the basis of the reference voltage.

The power supply unit may set the ramp voltage to a first slope. In this case, the output unit may generate an intermediate signal whose logical state switches at a timing at which the ramp voltage of the first slope increases or decreases beyond the voltage of the voltage signal. Moreover, the detection unit may detect the reference voltage on the basis of a logical sum or a logical product of the intermediate signals respectively generated by the plurality of multiply-accumulate devices.

The power supply unit may set the ramp voltage to a second slope such that the ramp voltage is equal to the reference voltage at a timing at which the output period ends. In this case, the output unit may output the multiply-accumulate signal whose logical state switches at a timing at which the ramp voltage of the second slope increases or decreases beyond the voltage of the voltage signal.

The output unit may temporarily store the voltage of the voltage signal.

The output unit may include an analog memory that retains the voltage of the voltage signal.

The positive weight value and an absolute value of the negative weight value may be fixed to a same value. In this case, the plurality of multiply-accumulate devices may be configured such that the total numbers of multiplication units that the plurality of multiply-accumulate devices respectively includes are equal to each other.

The input period may be set as a period in which input of the electrical signal provides a transition state in which the voltage of the accumulation unit continuously changes.

The electrical signal may have a pulse width corresponding to a period from a timing corresponding to the input value in the input period to an end timing of the input period.

A multiply-accumulate system according to an embodiment of the present technology includes the plurality of input lines and a network circuit including the plurality of multiply-accumulate devices.

The plurality of multiply-accumulate devices includes the plurality of multiplication units and the output unit.

MODE(S) FOR CARRYING OUT THE INVENTION

Hereinafter, embodiments according to the present technology will be described with reference to the drawings.

First Embodiment

[Configuration of Arithmetic Apparatus]

Figure 1:
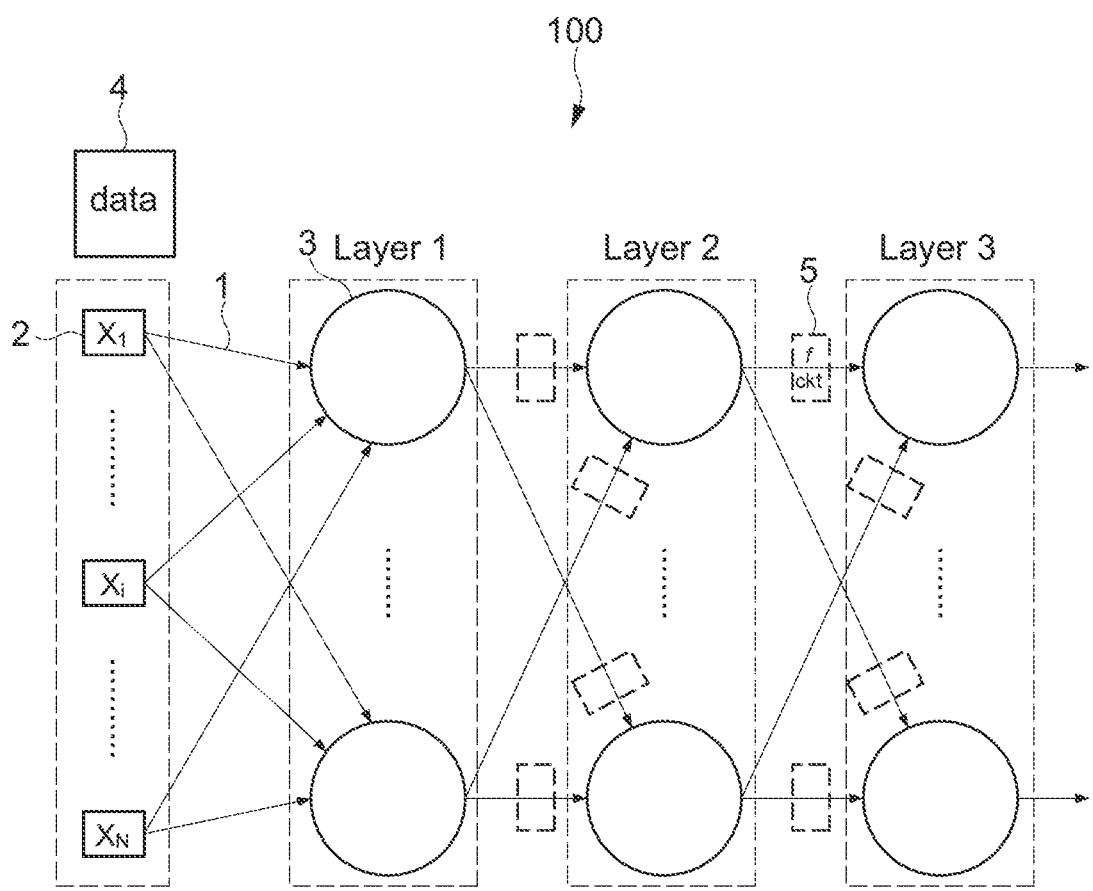
FIG. 1 A schematic diagram showing a configuration example of an arithmetic apparatus according to a first embodiment of the present technology.

FIG. 1 is a schematic diagram showing a configuration example of an arithmetic apparatus according a first embodiment of the present technology. An arithmetic apparatus 100 is an analog-type arithmetic apparatus that performs predetermined arithmetic processing including a multiply-accumulate operation. By using the arithmetic apparatus 100, for example, it is possible to perform arithmetic processing according to a mathematical model such as a neural network.

The arithmetic apparatus 100 includes a plurality of signal lines 1, a plurality of input units 2, and a plurality of analog circuits 3. Each of the signal lines 1 is a line that transmits a predetermined type of electrical signal. For example, an analog signal representing a signal value by using an analog amount such as a pulse timing and a pulse width is used as the electrical signal. The directions in which electrical signals are transmitted are schematically shown in FIG. 1 by means of arrows. In this embodiment, the analog circuits 3 corresponds to multiply-accumulate devices.

For example, the plurality of signal lines 1 is connected to one analog circuit 3. The signal line 1 that transmits an electrical signal to the analog circuit 3 is an input signal line, into which an electrical signal is input, for the analog circuit 3 to which that signal line 1 is connected. Moreover, the signal line 1 that transmits an electrical signal output from the analog circuit 3 is an output signal line, from which an electrical signal is output, for the analog circuit 3 to which that signal line 1 is connected. In this embodiment, the input signal line corresponds to an input line.

The plurality of input units 2 each generates a plurality of electrical signals corresponding to input data 4. The input data 4 is, for example, data to be processed using a neural network or the like implemented by the arithmetic apparatus 100. Therefore, it can also be said that the respective signal values of the plurality of electrical signals corresponding to the input data 4 are input values to the arithmetic apparatus 100.

For example, arbitrary data such as image data, audio data, and statistical data to be processed by the arithmetic apparatus 100 is used as the input data 4. For example, in a case where image data is used as the input data 4, an electrical signal using a pixel value (RGB value, luminance value, etc.) of each of pixels of the image data as a signal value is generated. In addition, an electrical signal corresponding to the input data 4 may be generated as appropriate in accordance with the type of the input data 4 and the contents of the processing performed by the arithmetic apparatus 100.

The analog circuit 3 is an analog-type circuit that performs a multiply-accumulate operation on the basis of an input electrical signal. The multiply-accumulate operation is, for example, an operation of adding up a plurality of product values obtained by multiplying a plurality of input values by weight values corresponding to input values. Therefore, it can also be said that the multiply-accumulate operation is processing of calculating a sum of the product values (hereinafter, referred to as a multiply-accumulate result).

As shown in FIG. 1, a plurality of input signal lines is connected to one analog circuit 3 and a plurality of electrical signals is provided thereto. The plurality of input signal lines and the analog circuit constitute a multiply-accumulate operation circuit according to this embodiment. Moreover, a plurality of electrical signals is input from each of the input signal lines, and a multiply-accumulate method according to this embodiment is accordingly performed by the multiply-accumulate operation circuit (analog circuit 3).

Hereinafter, it is assumed that the total number of electrical signals input into one analog circuit 3 is N. It should be noted that the number N of electrical signals to be input into each analog circuit 3 is set as appropriate for each circuit in accordance with, for example, the model, accuracy, and the like of arithmetic processing.

In the analog circuit 3, for example, a $w_i^* x_i$ is calculated which is a product value of a signal value $x_i$ represented by an electrical signal input from an i-th input signal line and a weight value $w_i$ corresponding to the signal value $x_i$. Here, i represents a natural number equal to or smaller than N (i=1, 2, ..., N). The operation of the product value is performed for each electrical signal (input signal line) and N product values are calculated. A value obtained by adding up the N product values is calculated as a multiply-accumulate result (sum of N product values). Therefore, the multiply-accumulate result calculated by one analog circuit 3 is expressed by the following expression.

$$\sum_{i=1}^{N} w_i \cdot x_i \quad \text{[Formula 1]}$$

The weight value $w_i$ is set, for example, in the range of $-\alpha \leq w_i \leq +\alpha$. Here, $\alpha$ represents an arbitrary real value. Thus, the weight value $w_i$ may include a positive weight value $w_i$, a negative weight value $w_i$, a zero weight value $w_i$, and the like. As described above, by setting the weight value $w_i$ to be in a predetermined range, it is possible to avoid the situation where the multiply-accumulate result diverges.

Moreover, for example, the range in which the weight value $w_i$ is set may be normalized. In this case, the weight value $w_i$ is set to be in a range of $-1 \leq w_i \leq 1$. Accordingly, for example, the maximum value, the minimum value, and the like of the multiply-accumulate result can be adjusted, and the multiply-accumulate operation can be performed with a desired accuracy.

In a neural network or the like, a method called binary connect, which sets the weight value $w_i$ to be either $+\alpha$ or $-\alpha$, can be used. The binary connect is used in various fields such as image recognition using a deep neural network (multi-layer neural network). The use of the binary connect can simplify the setting of the weight value $w_i$ without deteriorating the recognition accuracy and the like.

As described above, in the binary connect, the weight value $w_i$ is binarized into a binary value ($\pm\alpha$). Thus, a desired weight value $w_i$ can be easily set by changing the weight value $w_i$ to be positive or negative, for example. Alternatively, the binarized weight value $w_i$ may be normalized and the weight value $w_i$ may be set to $\pm 1$. In addition, the setting range, the setting value, and the like of the weight value $w_i$ are not limited, and may be set as appropriate such that desired processing accuracy is realized, for example.

The signal values $x_i$ are, for example, electrical signals output from the input units 2 and multiply-accumulate results output from the analog circuits 3. In this way, it can also be said that the input units 2 and the analog circuits 3 function as signal sources for outputting the signal values $x_i$.

In the example shown in FIG. 1, a single electrical signal (single signal value $x_i$) is output from one signal source (input unit 2, analog circuit 3). Therefore, the same electrical signal is input into each of the plurality of signal lines 1 connected to an output side of the one signal source. Moreover, one signal source and the analog circuit 3 into which the electrical signal output from the signal source is input are connected to each other by a single input signal line.

Therefore, for example, M input signal lines are connected to the analog circuit 3 connected to M signal sources in the arithmetic apparatus 100 shown in FIG. 1. In this case, the total number N of electrical signals input into the analog circuits 3 is N=M. It should be noted that a configuration in which a pair of electrical signals corresponding to positive and negative values (pair of signal values $x_i^+$, $x_i^-$) is output from one signal source is possible.

As shown in FIG. 1, the arithmetic apparatus 100 has a layered structure in which the plurality of analog circuits 3 is provided in each of a plurality of layers. By configuring the layer structure of the analog circuits 3, a multi-layer perceptron-type neural network or the like, for example, is constructed. The number of analog circuits provided in each layer, the number of layers, and the like are designed as appropriate such that desired processing can be performed, for example. Hereinafter, the number of analog circuits 3 provided in a j-th layer will be sometimes referred to as $N_j$.

For example, N electrical signals generated by N input units 2 are input into each analog circuit 3 provided in a layer of a first stage (lowest layer). The analog circuits 3 of the first stage calculate multiply-accumulate results related to the signal values $x_i$ of the input data, and output the calculated multiply-accumulate results to the analog circuits 3 provided in a next layer (second stage) after the non-linear conversion processing.

$N_1$ electrical signals representing the respective multiply-accumulate results calculated in the first stage are input into the respective analog circuits 3 provided in a second layer (upper layer). Therefore, as viewed from the analog circuits 3 of the second stage, the non-linear conversion processing results of the respective multiply-accumulate results calculated in the first stage are the signal values $x_i$ of the electrical signals. The analog circuits 3 of the second stage calculate the multiply-accumulate results of the signal values $x_i$ output from the first stage, and output the calculated multiply-accumulate results to the analog circuits 3 of the upper layer.

In this way, in the arithmetic apparatus 100, the multiply-accumulate results of the analog circuits 3 in the upper layer are calculated on the basis of the multiply-accumulate results calculated by the analog circuits 3 in the lower layer. Such processing is performed multiple times, and the processing results are output from the analog circuits 3 included in the top layer (the layer of the third stage in FIG. 1). Accordingly, for example, processing such as image recognition of determining that the object is a cat on the basis of image data (input data 4) obtained by imaging the cat can be performed.

As described above, a desired network circuit can be configured by connecting the plurality of analog circuits 3 as appropriate. The network circuit functions as a data flow processing system that performs arithmetic processing by, for example, causing signals to pass therethrough. In the network circuit, various processing functions can be realized by setting, for example, a weight value (synapse connection) as appropriate. With this network circuit, the multiply-accumulate system according to this embodiment is constructed.

It should be noted that the method of connecting the analog circuits 3 to each other and the like are not limited, and, for example, the plurality of analog circuits 3 may be connected to each other as appropriate such that desired processing can be performed. For example, the present technology can be applied even in a case where the analog circuits 3 are connected to each other so as to configure another structure different from the layered structure.

In the above description, the configuration in which the multiply-accumulate results calculated in the lower layer are input into the upper layer as they are has been described. The present technology is not limited thereto, and, for example, conversion processing or the like may be performed on the multiply-accumulate results. For example, in the neural network model, processing of, for example, performing non-linear conversion on the multiply-accumulate result of each analog circuit 3 by using an activation function and inputting the conversion results to the upper layer is performed.

In the arithmetic apparatus 100, a function circuit 5 or the like that performs non-linear conversion using an activation function on the electrical signal, for example, is used. The function circuit 5 is, for example, a circuit that is provided between a lower layer and an upper layer and that converts a signal value of an input electrical signal as appropriate and outputs an electrical signal according to the conversion result. The function circuit 5 is provided for each of the signal lines 1, for example. The number of function circuits 5, the arrangement of the function circuits 5, and the like are set as appropriate in accordance with, for example, the mathematical model implemented in the arithmetic apparatus 100.

For example, a ReLU function (ramp function) or the like is used as the activation function. The ReLU function outputs the signal value $x_i$ as it is in a case where the signal value $x_i$ is 0 or more, for example, and outputs 0 otherwise. For example, the function circuit 5 that implements the ReLU function is connected to each of the signal lines 1 as appropriate. Accordingly, it is possible to realize the processing of the arithmetic apparatus 100.

Figure 2:
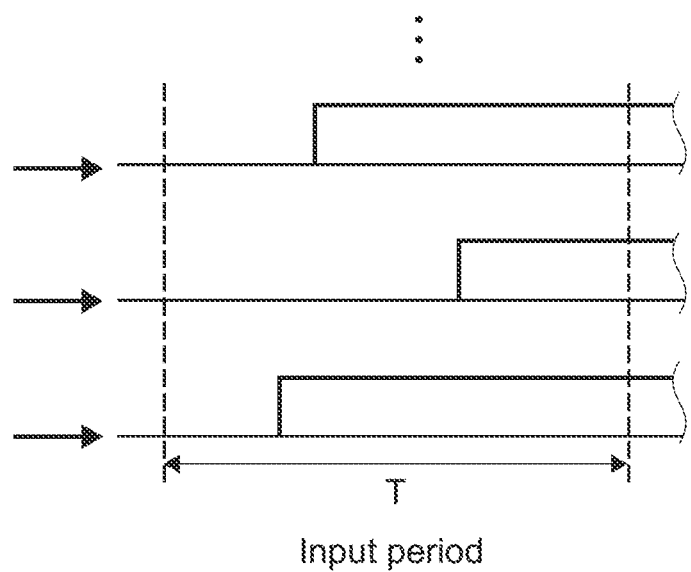
FIG. 2 A schematic diagram showing an example of an electrical signal to be input into an analog circuit.

FIG. 2 is a schematic diagram showing an example of the electrical signal input into the analog circuit 3. In FIG. 2, a graph representing a waveform of a plurality of electrical signals is schematically shown. The horizontal axis of the graph indicates the time axis and the vertical axis indicates the voltage of the electrical signal. It should be noted that the time axis of each graph is common.

In FIG. 2, an exemplary waveform of the electrical signal of a spike timing method (hereinafter, referred to as TACT method) is shown. In the TACT method, a signal representing a signal value $x_i$ by using the rising timing of the pulse is used as the electrical signal. For example, a pulse is input at a timing corresponding to the signal value by using a predetermined timing as a reference.

In this embodiment, the electrical signal (pulse) is input within the predetermined input period T. The signal value $x_i$ is represented by the input timing of the pulse within this input period T. Therefore, a pulse input at the same time as the start of the input period T represents a largest signal value $x_i$. A pulse input at the same time as the end of the input period T represents a smallest signal value $x_i$.

In other words, it can also be said that the signal value $x_i$ is represented by the duration from the input timing of the pulse to the end timing of the input period T. In this case, a pulse whose duration from the input timing of the pulse to the end timing of the input period T is equal to the input period T represents the largest signal value $x_i$. A pulse whose duration from the input timing of the pulse to the end timing of the input period T is zero represents the smallest signal value $x_i$.

In FIG. 2, a continuous pulse signal that rises to a timing corresponding to the input value and keeps the ON level until the multiply-accumulate result is obtained is used. The present technology is not limited thereto, and a rectangular pulse or the like having a predetermined pulse width may be used as the electrical signal.

It can also be said that the analog circuit 3 according to this embodiment is the analog circuit 3 according to the TACT method. In this embodiment, a time-axis analog multiply-accumulate operation using the analog circuit 3 according to the TACT method can be performed.

Hereinafter, the description will be made assuming that the signal value $x_i$ represented by each electrical signal is a variable of 0 or more and 1 or less.

Figure 3:
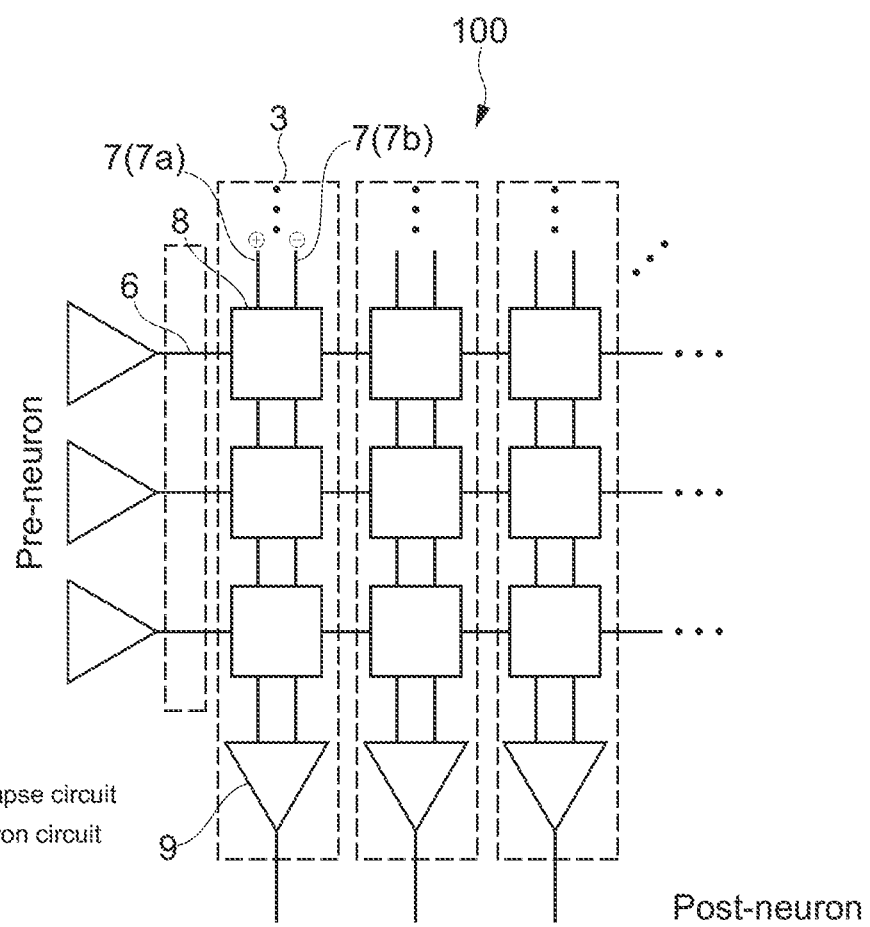
FIG. 3 A schematic diagram showing a specific configuration example of an arithmetic apparatus.

FIG. 3 is a schematic diagram showing a specific configuration example of the arithmetic apparatus 100. FIG. 3 is an arrangement example of circuits for realizing the arithmetic apparatus 100 shown in FIG. 1, for example, and schematically shows the plurality of analog circuits 3 provided in one layer of the arithmetic apparatus 100.

The analog circuits 3 each include a pair of output lines 7, a plurality of synapse circuits 8, and a neuron circuit 9. As shown in FIG. 3, one analog circuit 3 is configured to extend in a predetermined direction (vertical direction in the figure). A plurality of such analog circuits 3 extending in the vertical direction are arranged side by side in the horizontal direction, to thereby form one layer. Hereinafter, it is assumed that the analog circuit 3 disposed on the leftmost side in the figure is a first analog circuit 3. Moreover, the direction in which the analog circuits 3 extend will be sometimes referred to as an extension direction. In this embodiment, the neuron circuit 9 corresponds to an output unit.

The pair of output lines 7 is spaced apart from each other along the extension direction. The pair of output lines 7 includes a positive charge output line 7a and a negative charge output line 7b. Each of the positive charge output line 7a and the negative charge output line 7b is connected to the neuron circuit 9 via the plurality of synapse circuits 8.

The synapse circuit 8 calculates a product value ($w_i * x_i$) of the signal value $x_i$ represented by the electrical signal and the weight value $w_i$. Specifically, a charge (current) corresponding to the product value is output to either the positive charge output line 7a or the negative charge output line 7b.

As will be described later, either the positive weight value or the negative weight value is set to the synapse circuit 8. For example, a positive weight charge corresponding to the product value of the positive weight value $w_i^+$ is output to the positive charge output line 7a. Moreover, for example, a negative weight charge corresponding to the product value of the negative weight value is output to the negative charge output line 7b.

It should be noted that in the synapse circuit 8, a charge with the same sign (e.g., a positive charge) is output as the charge corresponding to the product value irrespective of whether the weight value $w_i$ is positive or negative. That is, the positive weight charge and the negative weight charge become charges with the same sign.

In this way, the synapse circuits 8 are each configured to output the charge corresponding to the multiplication result to the different output line 7a or 7b in accordance with the sign of the weight value $w_i$. A specific configuration of the synapse circuit 8 will be described later in detail. In this embodiment, the synapse circuit 8 corresponds to the multiplication unit.

In this embodiment, the single input signal line 6 and the pair of output lines 7 are connected to the single synapse circuit 8. That is, a single electrical signal is input into the single synapse circuit 8 and a charge corresponding to the product value calculated on the basis of the input electrical signal is output to either the output line 7a or 7b. Thus, the synapse circuit 8 is a one-input two-output circuit connected to the single input signal line 6 and the pair of output lines 7 (positive charge output line 7a and the negative charge output line 7b).

In one analog circuit 3, the plurality of synapse circuits 8 is arranged along the pair of output lines 7. Each synapse circuits 8 is connected in parallel to the positive charge output line 7a (negative charge output line 7b). Hereinafter, it is assumed that the synapse circuit 8 disposed on a most downstream side (side connected to the neuron circuit 9) is a first synapse circuit.

As shown in FIG. 3, the plurality of input signal lines 6 is wired so as to intersect with the pair of output lines 7 of each of the plurality of analog circuits 3. Typically, the input signal line 6 is provided to be orthogonal to each output line 7. That is, the arithmetic apparatus 100 has a crossbar configuration in which the input signal lines 6 and the output lines 7 cross each other. With the crossbar configuration, the analog circuits 3 and the like, for example, can be integrated at high density.

Moreover, in the arithmetic apparatus 100, j-th synapse circuits 8 included in the respective analog circuits 3 are connected in parallel to a j-th input signal line 6. Therefore, similar electrical signals are input into the synapse circuits 8 connected to the same input signal line 6. Accordingly, a configuration in which one signal source included in the lower layer is connected to a plurality of analog circuits 3 included in the upper layer can be implemented.

It should be noted that in the example shown in FIG. 3, the analog circuit 3 (pre-neuron) included in the lower layer is schematically shown as a signal source that inputs an electrical signal into each of the input signal lines 6. The present technology is not limited thereto, and, for example, the crossbar configuration can be used also in a case where the input unit 2 is used as the signal source.

As described above, in the arithmetic apparatus 100, the plurality of analog circuits 3 is connected in parallel to each of the plurality of input signal lines 6. Accordingly, for example, it is possible to input an electrical signal in parallel into each analog circuit 3 (each synapse circuit 8) and to achieve arithmetic processing at high speed. As a result, it is possible to exhibit excellent operation performance.

The neuron circuit 9 calculates a multiply-accumulate result shown in the expression (Formula 1) on the basis of the product values calculated by the synapse circuits 8. Specifically, the neuron circuit 9 outputs an electrical signal representing the multiply-accumulate result (multiply-accumulate signal) on the basis of charges input via the pair of output lines 7.

Figure 4:
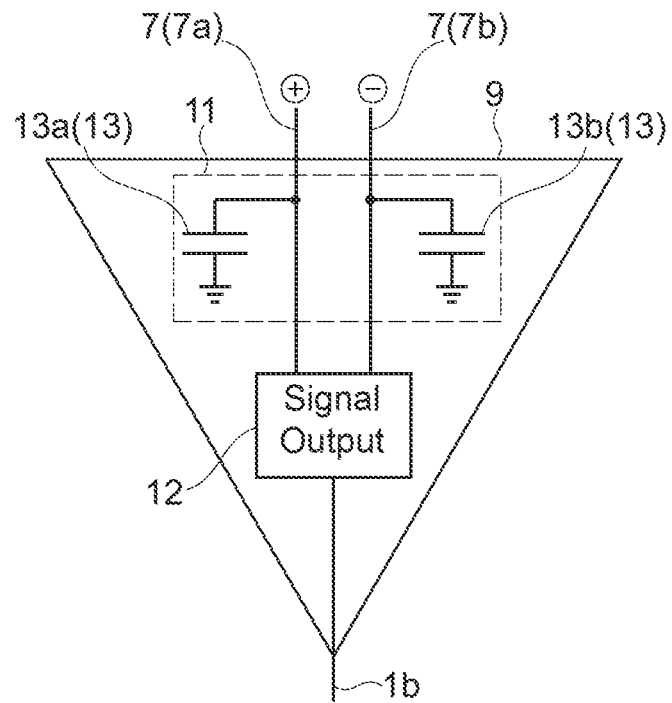
FIG. 4 A schematic diagram showing a configuration example of a neuron circuit.

FIG. 4 is a schematic diagram showing a configuration example of the neuron circuit 9. The neuron circuit 9 includes an accumulation unit 11 and a signal output unit 12. FIG. 4 shows a two-input one-output neuron circuit 9 connected to a pair of output lines 7 and a single output signal line 10. It should be noted that a two-input two-output circuit or the like can be used as the neuron circuit 9 in some cases.

The accumulation unit 11 accumulates charges corresponding to the product values respectively generated by the plurality of synapse circuits 8. The accumulation unit 11 includes two capacitors 13a and 13b. The capacitor 13a is connected between the positive charge output line 7a and the GND. Moreover, the capacitor 13b is connected between the negative charge output line 7b and the GND. Therefore, charges flowing in from the positive charge output line 7a and the negative charge output line 7b are respectively accumulated in the capacitors 13a and 13b.

For example, when the input period T of the electrical signal has elapsed, the charges accumulated in the capacitor 13a are a sum total $\sigma^+$ of positive weight charges each corresponding to the product value of the positive weight value $w_i^+$. Also, the charges accumulated in the capacitor 13b are a sum total $\sigma^-$ of negative weight charges corresponding to the product value of the negative weight value $w_i^-$. In this way, the accumulation unit 11 is capable of accumulating each of the positive weight charge and the negative weight charge.

For example, in a case where the positive weight charges are accumulated in the capacitor 13a, the potential of the positive charge output line 7a with reference to the GND increases. Therefore, the potential of the positive charge output line 7a is a value depending on the sum total $\sigma^+$ of the charges each corresponding to the product value of the positive weight value $w_i^+$. It should be noted that the potential of the positive charge output line 7a corresponds to the voltage retained by the capacitor 13a.

Similarly, in a case where the negative weight charges are accumulated in the capacitor 13b, the potential of the negative charge output line 7b with reference to the GND increases. Therefore, the potential of the negative charge output line 7b is a value depending on the sum total $\sigma^-$ of the charges each corresponding to the product value of the negative weight value $w_i^-$. It should be noted that the potential of the negative charge output line 7b corresponds to the voltage retained by the capacitor 13b.

The signal output unit 12 outputs a multiply-accumulate signal representing a sum of the product values ($w_i^+ * x_i$) on the basis of the charges accumulated in the accumulation unit 11. The multiply-accumulate signal is, for example, a signal representing a total multiply-accumulate result, which is a sum of product values of all positive and negative weight values $w_i$ and signal values $x_i$. For example, the multiply-accumulate result represented by the expression (Formula 1) can be written as follows.

$$\sum_{i=1}^{N} w_i x_i = \sum_{i=1}^{N^+} w_i^+ + x_i - \sum_{i=1}^{N^-} |w_i^-| x_i \qquad \text{[Formula 2]}$$

Here, $N^+$ and $N^-$ are the total number of positive weight values $w_i^+$ and the total number of negative weight values $w_i^-$, respectively. As shown in the expression (Formula 2), the total multiply-accumulate result can be calculated as a difference between a multiply-accumulate result of positive weight charges, which is a sum total of product values ($w_i^+ * x_i$) of the positive weight values $w_i^+$, and a multiply-accumulate result of negative weight charges, which is a sum total of product values ($|w_i^-| * x_i$) of the negative weight values $w_i^-$.

In the example shown in FIG. 4, the signal output unit 12 generates one signal representing the total multiply-accumulate result, for example, as the multiply-accumulate signal. Specifically, by referring to the charges accumulated in the accumulation unit 11 (capacitors 13a and 13b) as appropriate, a positive multiply-accumulate result and a negative multiply-accumulate result are calculated, and the total multiply-accumulate result is calculated on the basis of the difference therebetween.

The method of referring to the charges accumulated in the accumulation unit 11 is not limited. As an example, a method of detecting charges accumulated in one capacitor 13 will be described. Here, it is assumed that the electrical signal according to the TACT method illustrated in FIG. 2B is used. That is, charges are accumulated in the capacitor 13 because the ON level is maintained also after the input period T ends.

For this charge accumulation, the timing at which the potential of the output line to which the capacitor 13 is connected reaches the predetermined threshold potential is detected by using the comparator or the like. For example, as more charges are accumulated at the end of input period T, the timing at which the potential reaches the threshold potential becomes earlier. Therefore, the charges (multiply-accumulate result) accumulated during the input period T can be represented on the basis of the timing. It should be noted that this threshold determination corresponds to detecting the timing at which the voltage retained by the capacitor 13 reaches the threshold voltage.

For example, by performing the threshold determination in this manner, a timing to represent the multiply-accumulate result is detected. The multiply-accumulate signal of positive weight charges, the multiply-accumulate signal of negative weight charges, or the total multiply-accumulate signal is generated as appropriate on the basis of the detection result. In addition, each multiply-accumulate result may be calculated by directly reading the potential of the capacitor 13 when the input period T ends, for example.

Figure 5:
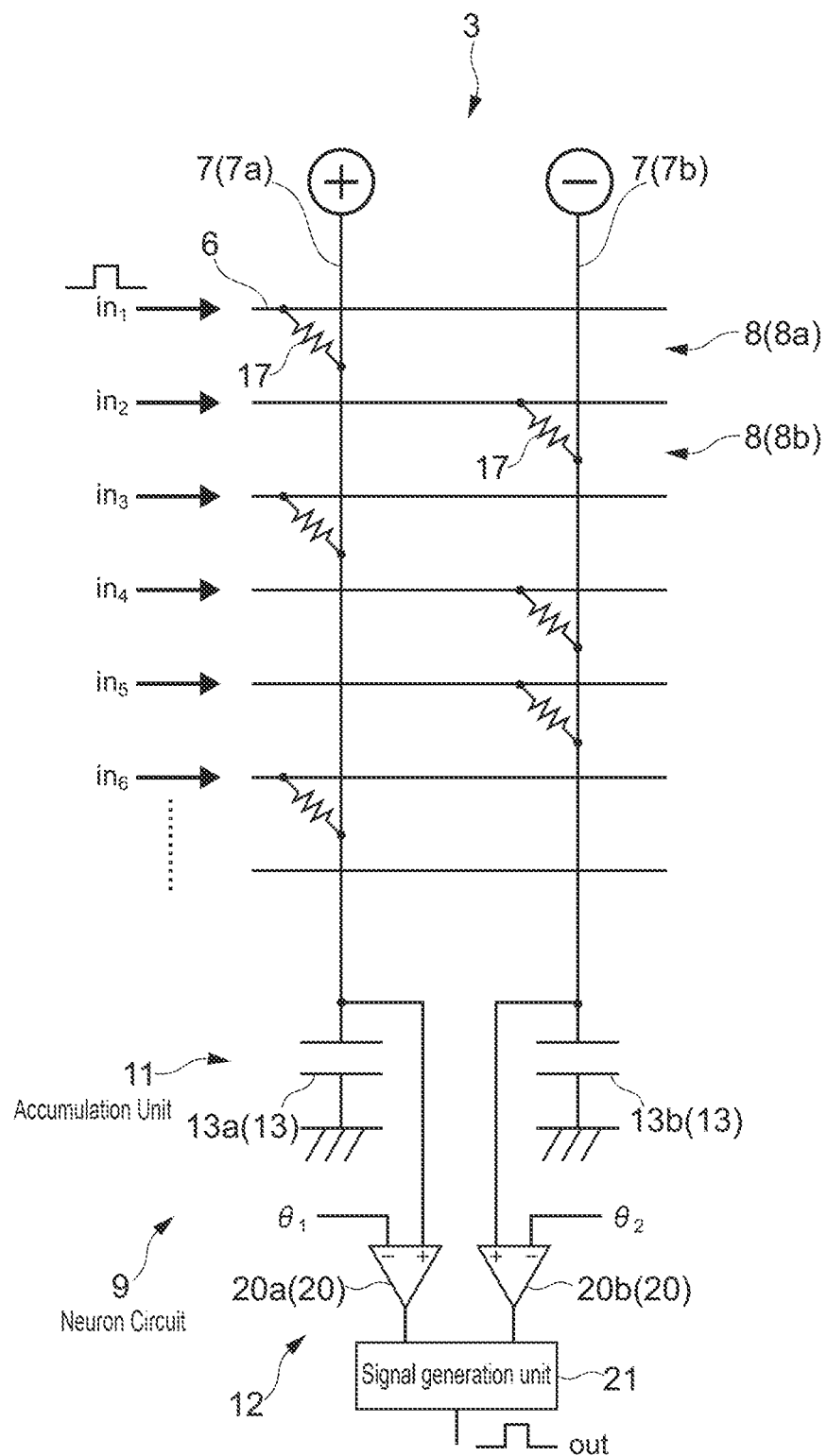
FIG. 5 A schematic circuit diagram showing an example of an analog circuit.

FIG. 5 is a schematic circuit diagram showing an example of the analog circuit. The analog circuit 3 is provided extending in a direction orthogonal to the plurality of input signal lines 6. That is, in the example shown in FIG. 5, the crossbar configuration is employed. Hereinafter, the electrical signal input into each input signal line 6 will be referred to as an input signal.

The analog circuit 3 includes the pair of output lines (positive charge output line 7a and negative charge output line 7b), a plurality of synapse circuits (plurality of multiplication units) 8, and a neuron circuit 9. In the example shown in FIG. 5, the neuron circuit 9 includes the accumulation unit 11, and a signal output unit 12.

Pulse signals (TACT signals) are input into the plurality of input signal lines 6 as input signals $in_1$ to $in_6$ at timings corresponding to the signal values $x_i$. In the example shown in FIG. 5, six input signal lines 6 are shown, though the number of input signal lines 6 is not limited. The input signals $in_1$ to $in_6$ are input within the input period T having a predetermined duration (see FIG. 6).

The positive charge output line 7a outputs the positive weight charges corresponding to the product values ($w_i^{+*} x_i$) each obtained by multiplying the signal value $x_i$ by the positive weight value $w_i^+$. The negative charge output line 7b outputs the negative weight charges corresponding to the product values ($|w_i^-| * x_i$) each obtained by multiplying the signal value $x_i$ by the negative weight value $w_i^-$.

The plurality of synapse circuits 8 is provided to be associated with the plurality of input signal lines 6, respectively. In this embodiment, one synapse circuit 8 is provided in one input signal line 6. Each of the plurality of synapse circuits 8 includes a resistor 17 that is connected between the corresponding input signal line 6 of the plurality of input signal lines 6 and any one of the positive charge output line 7a or the negative charge output line 7b. This resistor 17 may have a non-linear characteristic and may have a function of preventing backflow of current. A charge corresponding to the product value ($w_i^{+*} x_i$) (or ($|w_i^-* x_i|$)) is output to the output line 7a (or 7b) to which the resistor 17 is connected.

For example, in order to multiply the signal value $x_i$ by the positive weight value $w_i^+$ in each synapse circuit 8, the resistor 17 is connected between the input signal line 6 and the positive charge output line 7a and the positive charge output line 7a is made to output a positive weight charge. In the example shown in FIG. 5, the synapse circuit 8 into which the input signal $in_1$, $in_3$, $in_6$ is input is a synapse circuit 8a configured as the positive weight multiplication unit that generates a positive weight charge. It can also be said that the synapse circuit 8a is a multiplication unit in which a positive weight is set.

In order to multiply the signal value $x_i$ by the negative weight value $w_i^-$ in each synapse circuit 8, the resistor 17 is connected between the input signal line 6 and the negative charge output line 7b and the negative charge output line 7b is made to output a negative weight charge. In the example shown in FIG. 5, the synapse circuit 8 into which the input signal $in_2$, $in_4$, $in_5$ is input is a synapse circuit 8b configured as the negative weight multiplication unit that generates a negative weight charge. It can also be said that the synapse circuit 8b is a multiplication unit in which a negative weight is set.

As described above, the plurality of synapse circuits 8 generates a charge corresponding to the product value obtained by multiplying the weight value to the signal value and outputs it to each output line on the basis of the electrical signal input into each of the plurality of input lines. Accordingly, the multiplication processing of the multiply-accumulate operation can be performed at high speed at the same timing.

It should be noted that a resistor having a resistance value corresponding to the weight value $w_i$ to be set is used as the resistor 17. That is, the resistor 17 functions as an element that defines the weight value $w_i$ in the arithmetic apparatus 100 that performs multiply-accumulate operations at the analog circuits 3.

For example, a fixed resistor element, a variable resistor element, a MOS transistor that operates in a sub-threshold region, or the like is used as the resistor 17. By using a MOS transistor that operates in the sub-threshold region as the resistor 17, for example, it is possible to reduce the power consumption. As a matter of course, another arbitrary resistor may be used. In this embodiment, the resistors 17 having the same resistance value are used. That is, each weight value $w_i$ is represented using the same resistance value. Accordingly, the positive weight value $w_i^+$ and the absolute values of the negative weight value are set to be equal to each other, and the binary connect in which the weight value is binarized is realized.

The accumulation unit 11 accumulates charges corresponding to the product values ($w_i^* x_i$) generated by the plurality of synapse circuits 8. In this embodiment, two capacitors 13a and 13b are provided as the accumulation unit 11.

The capacitor 13a is connected to the positive charge output line 7a to accumulate the positive weight charges generated by the synapse circuits 8a. In this embodiment, the capacitor 13a functions as a positive weight accumulation unit. The capacitor 13b is connected to the negative charge output line 7b to accumulate the negative weight charges generated by the synapse circuits 8b. In this embodiment, the capacitor 13b functions as a negative weight accumulation unit.

With elapse of time, the potential $V^+$ of the positive charge output line 7a (the voltage retained by the capacitor 13a) and the potential $V^-$ of the negative charge output line 7b (the voltage retained by the capacitor 13b) are each increased.

After the input period T ends, the signal output unit 12 performs threshold determination on the voltage retained by the accumulation unit 11 on the basis of a predetermined threshold value, to thereby output a multiply-accumulate signal representing a sum of the product values ($w_i^* x_i$). In the example shown in FIG. 5, two comparators 20a and 20b and a signal generation unit 21 are provided as the signal output unit 12.

The comparator 20a detects a timing at which the voltage retained by the capacitor 13a exceeds a predetermined threshold value $\theta 1$. It should be noted that the magnitude of the voltage retained by the capacitor 13a is determined by the total amount of positive weight charge accumulated in the capacitor 13a and the charge amount.

The comparator 20b detects a timing at which the voltage retained by the capacitor 13b exceeds a predetermined threshold value $\theta 2$. It should be noted that the magnitude of the voltage retained by the capacitor 13b is determined by the total amount of negative weight charge accumulated in the capacitor 13b and the charge amount.

It should be noted that in this embodiment, a multiply-accumulate signal is output by performing threshold determination on each of the capacitors 13a and 13b with the same threshold value. That is, the threshold value $\theta 1$=the threshold value $\theta 2$ is set.

The signal generation unit 21 outputs a multiply-accumulate signal representing a sum of the product values ($w_i^* x_i$) on the basis of the timing detected by the comparator 20a and the timing detected by the comparator 20b. In other words, the signal generation unit 21 outputs a multiply-accumulate signal on the basis of a timing at which the voltage retained by the capacitor 13a reaches the threshold value $\theta 1$ and a timing at which the voltage retained by the capacitor 13b reaches the threshold value $\theta 2$ (=$\theta 1$).

In this embodiment, the multiply-accumulate signal representing the multiply-accumulate result, which is the sum of the product values, as time information is output. For example, the TACT signal, which is the pulse signal the input timing of which has been modulated, is output as the multiply-accumulate signal (see FIG. 2). Moreover, for example, a PMW signal, which is a pulse signal the pulse width of which has been modulated, is output as the multiply-accumulate signal. The specific circuit configuration and the like of the signal generation unit 21 are not limited and may be arbitrarily designed.

Figure 6:
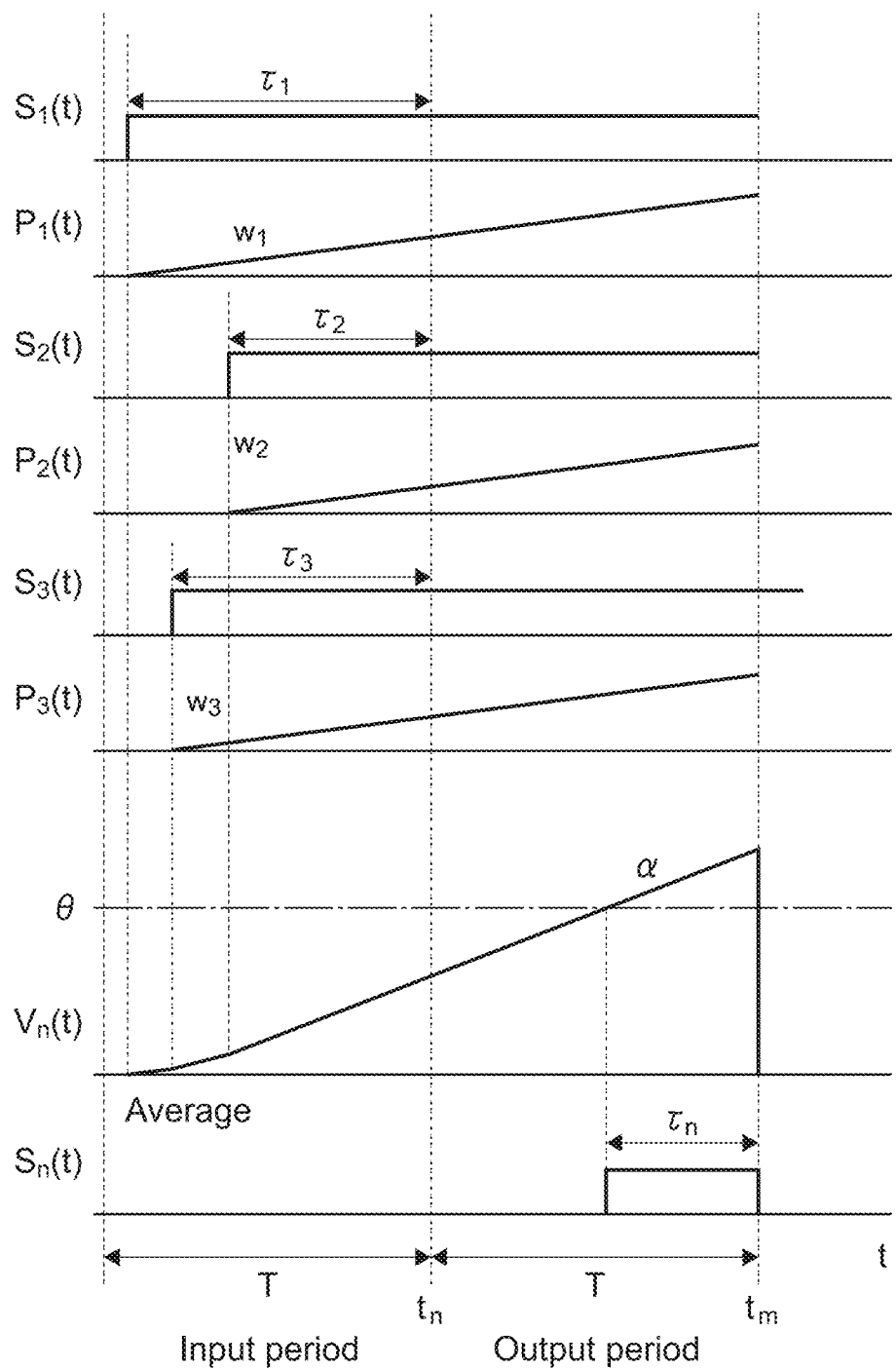
FIG. 6 A diagram for describing a calculation example of a multiply-accumulate signal by the analog circuit shown in FIG. 5.

FIG. 6 is a diagram for describing a calculation example of the multiply-accumulate signal by the analog circuit 3 shown in FIG. 5. In this embodiment, a signal representing the total multiply-accumulate result including the positive and negative values is calculated on the basis of the multiply-accumulate result of positive weight charges based on the positive weight charges accumulated in the capacitor 13a and the multiply-accumulate result of negative weight charges based on the negative weight charges accumulated in the capacitor 13b.

The calculation of the multiply-accumulate result of the positive weight charges and the calculation of the multiply-accumulate result of the negative weight charges are the same processing. First, an exemplary method of calculating the multiply-accumulate result on the basis of the charges accumulated in the capacitor 13 without discrimination between positive and negative values will be described with reference to FIG. 6.

The parameters described in FIG. 6 will be described. "t" represents time. "T" represents each of the input period and the output period. "$t_n$" represents an end timing of the input period T and "$t_m$" represents an end timing of the output period T.

In this embodiment, the duration of the input period T and the duration of the output period T are set to be equal to each other. Moreover, in the example shown in FIG. 6, the output period T is started from an end timing $t_n$ of the input period T. Therefore, the end timing $t_n$ of the input period T corresponds to the start timing of the output period T.

"$S_i(t)$" represents an input signal (TACT signal) input into an i-th input signal line 6. "$\tau_i$" represents the duration from the input timing of the input signal $S_i(t)$ to the end timing $t_n$ of the input period T. Hereafter, "$\tau_i$" may be referred to as the pulse width of the input signal $S_i(t)$ in the input period T. As "$\tau_i$" becomes larger, the input signal t(t) is a signal representing a larger signal value $x_i$.

"$P_i(t)$" represents an amount of change of an internal state (potential) in each synapse circuit 8 shown in FIG. 5. "$w_i$" represents a weight value and is defined by the resistance value of the resistor 17 shown in FIG. 5. Here, it is assumed that the potential corresponding to each synapse circuit 8 increases linearly over time. The resistance value of the resistor 17 at this time is, for example, set such that the slope of the potential is "$w_i$".

"$\alpha$" represents the slope of the potential rise of the capacitor 13 in the output period T after the input period T, and is the charging speed of the capacitor 13. In the example shown in FIG. 6, each synapse circuit 8 is maintained at the ON level after the input period T has elapsed, and thus the potential of the capacitor 13 rises at the slope "$\alpha$". It should be noted that when charging the capacitor 13 in the output period, $\alpha$ is a value corresponding to the charging speed. $\theta$ represents a threshold value used for threshold determination performed by the signal output unit 12 (comparator 20).

"$V_n(t)$" represents a sum total of "$P_i(t)$" and corresponds to the total amount of charge accumulated in the capacitor 13. "$S_n(t)$" represents a multiply-accumulate signal (PWM signal) representing the multiply-accumulate result. "$\tau_n$" represents the pulse width of the multiply-accumulate signal to be output. Specifically, "$\tau_n$" represents a value corresponding to the duration from the timing at which the voltage retained by the capacitor 13 exceeds the threshold value $\theta$ in the output period T to the end timing $t_m$ of the output period T.

Here, as shown in the following expression, the input value (signal value) $x_i$ is given by the duty ratio $R_i$ (=$\tau/T$) of the pulse width $\tau_i$ of the input signal $S_i(t)$ the input period T to the input period T.

$$x_i = R_i\left(=\frac{\tau_i}{T}\right) \quad \text{[Formula 3]}$$

The synapse circuit 8 shown in FIG. 5 generates the charge corresponding to the product value obtained by multiplying the signal value $x_i$ by the weight value $w_i$. Specifically, the resistance of the resistor 17 increases the internal state (potential) at a constant slope $w_i$.

The amount of change $P_i(t_n)$ of the internal potential of each synapse circuit 8 at the end timing $t_n$ of the input period T is given by the following expression. It should be noted that the high-level value of the input-signal $S_i(t)$ is set to 1.

$$P_i(t_n) = w_i R_i T = w_i x_i T \quad \text{[Formula 4]}$$

The total amount $V_n(t_n)$ of charge accumulated in the capacitor 13 is a sum total of $P_i(t_n)$, and thus it is given by the following expression.

$$V_n(t_n) = \sum_{i=1}^{N} P_i(t_n) = T\sum_{i=1}^{N} w_i x_i \quad \text{[Formula 5]}$$

In the example shown in FIG. 5, after the end timing $t_n$ of the input period T, the internal state (potential) is increased at the slope $w_i$ in all the synapse circuits 8. Therefore, in the output period T, the potential is increased at a slope (charging speed) that is a sum total of the respective "$w_i$". In this case, the slope that is the sum total of the respective "$w_i$" is "$\alpha$". A multiply-accumulate signal (PWM signal) having a pulse width $\tau_n$ corresponding to the duration from the timing at which the voltage retained by the capacitor 13 exceeds the threshold value $\theta$ in the output period T to the end timing $t_m$ of the output period T is generated.

Assuming that the duty ratio of the pulse width $\tau_n$ of the multiply-accumulate signal to the output period T is $R_n$ (=$\tau_n/T$), $R_n$ is given by the following expression. It should be noted that the threshold value $\theta$ is equal to or larger than the total amount $V_n(t_n)$ of charge.

$$R_n = \frac{T - \frac{(\theta - V_n(t_n))}{\alpha}}{T} = \frac{1}{\alpha}\sum_{i=1}^{N} w_i x_i + \frac{(\alpha T - \theta)}{\alpha T} \quad \text{[Formula 6]}$$

Therefore, the multiply-accumulate result obtained by adding up product values ($w_i * x_i$) each obtained by multiplying the signal value $x_i$ by the weight value $w_i$ is given by the following expression.

$$\sum_{i=1}^{N} w_i x_i = \alpha R_n - \frac{(\alpha T - \theta)}{\alpha T} \quad \text{[Formula 7]}$$

That is, the multiply-accumulate result is a value obtained by subtracting the constant defined by the charging speed a, the threshold value $\theta$, and the output period T from $\alpha R_n = \alpha \cdot (\tau_n/T)$. In this way, the multiply-accumulate signal representing the multiply-accumulate result can be output on the basis of the timing at which the voltage retained by the accumulation unit 11 exceeds the threshold value $\theta$ in the output period T having the predetermined duration.

In the example shown in FIG. 5, the multiply-accumulate signal representing the multiply-accumulate result shown in the expression (Formula 7) is calculated for each of the positive weight charge and the negative weight charge. For example, the comparators 20a and 20b generate a multiply-accumulate signal $S_n^+(t)$ representing the multiply-accumulate result of positive weight charges and a multiply-accumulate signal $S_n^-(t)$ representing the multiply-accumulate result of negative weight charges. At this time, a pulse width $\tau_n^+$ of $S_n^+(t)$ is a value corresponding to the multiply-accumulate result of the positive weight charges and a pulse width $\tau_n^-$ of $S_n^-(t)$ is a value corresponding to the multiply-accumulate result of the negative weight charges.

By substituting the pulse widths $\tau_n^+$ and $\tau_n^-$ into the above expression (Formula 7), it is possible to calculate the multiply-accumulate result of the positive weight charges and the negative weight charges. The total multiply-accumulate result of the analog circuit 3 is calculated by subtracting the multiply-accumulate result of the negative weight charges from the multiply-accumulate result of the positive weight charges on the basis of the expression (Formula 2). Such an operation can be realized by configuring the signal generation unit 21 as appropriate, for example.

In the example shown in FIG. 6, the multiply-accumulate signal $S_n(t)$ representing the multiply-accumulate signal by the pulse width is generated by charging the capacitor 13 in the output period T and performing the threshold determination on its voltage. In other words, it can also be said that the accumulation of charges in the output period T is performed for generating a signal representing the multiply-accumulate result on the time axis (pulse width). That is, the output period T is a charging period for performing the threshold determination on charges (voltage) accumulated at the end timing of the input period T.

Here, the inventor examined the charges accumulated in the analog circuit 3. The inventor focused on the voltage of the capacitor 13 at the end timing of the input period T in which the respective input signals are input and devised a new technology for outputting the multiply-accumulate signal using the voltage of the capacitor 13. It will be described in detail below.

Figure 7:
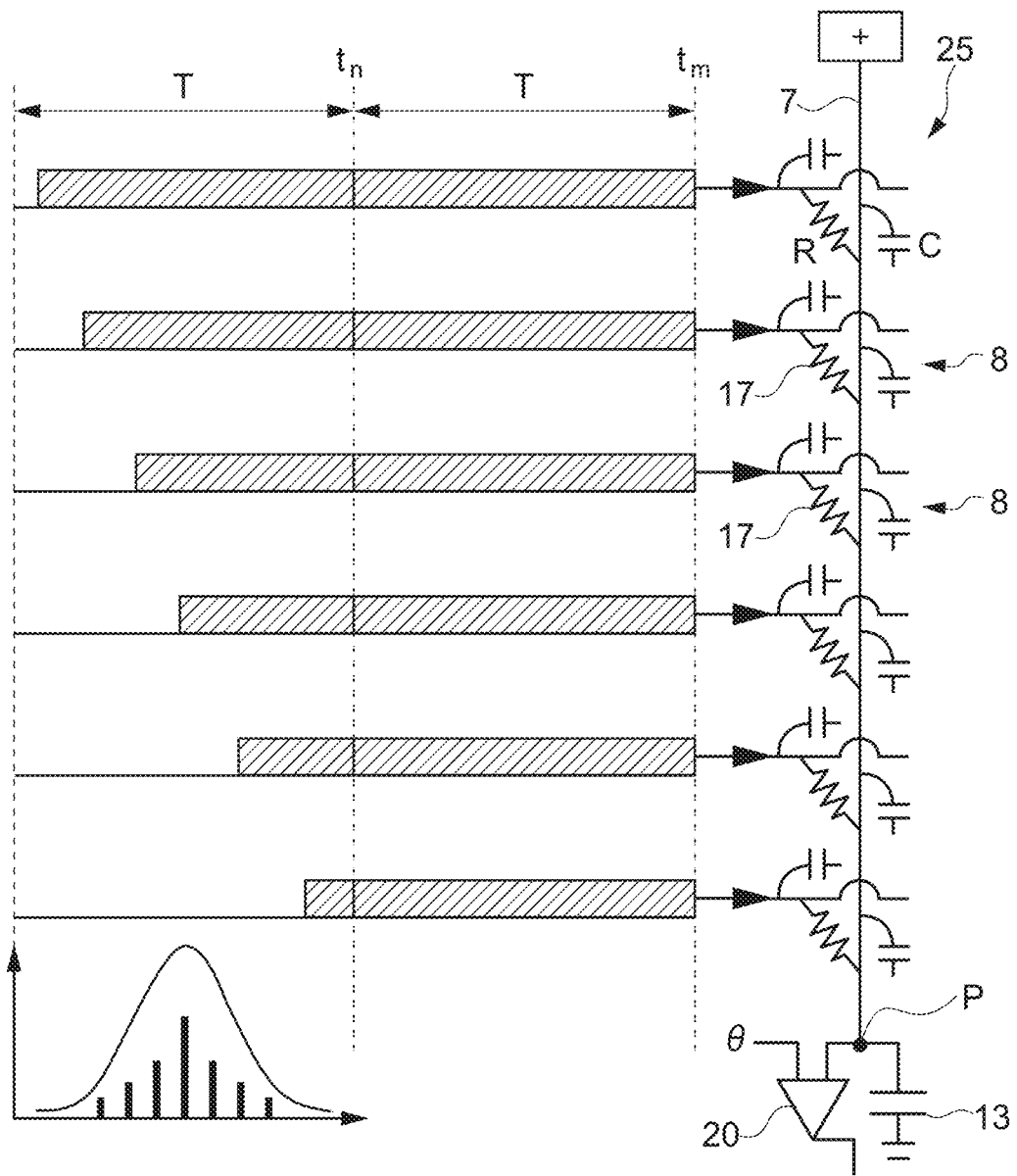
FIG. 7 A schematic diagram showing an example of input signals input into a plurality of synapse circuits.

FIG. 7 is a schematic diagram showing exemplary input signals input into the plurality of synapse circuits 8. On the right side of FIG. 7, a schematic circuit diagram of a circuit (hereinafter, referred to as accumulation circuit 25) that accumulates charges generated by six synapse circuits 8 is shown. Moreover, on the left side of FIG. 7, input signals input into the respective synapse circuits 8 are schematically shown. It should be noted that it is assumed that the input signals are signals that are maintained in the ON state also after the input period T ends.

The accumulation circuit 25 includes six resistors 17 (synapse circuits 8) connected in parallel to the capacitor 13, and the comparator 20 is connected to a connection point (output point P) between the resistors 17 and the capacitor 13. The accumulation circuit 25 is a circuit constituting a part of the analog circuit 3 shown in FIG. 5, for example. It should be noted that the potential of the output point P using the GND as a reference is the voltage of the capacitor 13, and corresponds to the voltage of the accumulation unit.

Charges generated by the resistors 17 of the respective synapse circuits 8 charge the parasitic capacitance on the output line 7 side and are output to the output point P and are also accumulated simultaneously in the capacitor 13. That is, the capacitor 13 is charged integrally with the parasitic capacitance on the output line 7 side. At this time, the potential of the output point P rises at a time constant corresponding to a combined resistance of the resistors 17 and a combined capacitance (i.e., a combined capacitance of all the parasitic capacitances on the output line 7 side and the capacitor 13). It should be noted that in FIG. 7, the parasitic capacitances on the input signal line side and the parasitic capacitances on the output line side are both shown.

Here, the inventor examined the time constant of the output lines 7 as a parameter associated with the potential of the output lines 7 (output point P). As a result, as described below, the inventor found a configuration that makes the time constant for the output lines 7 irrespective of the number of resistors 17 disposed between the output lines 7 and the plurality of input signal lines.

First, it is assumed that the capacitors functionally include a parasitic capacitance generated in the output lines as described above. In this case, a minimum value of the capacitance that can be taken by the capacitors 13a and 13b is a parasitic capacitance generated in the output lines 7. For example, even in a case where the capacitors 13 are not provided, charges are accumulated on the basis of the parasitic capacitance generated in the output lines 7a and 7b.

The time constant of the output lines 7 sequentially changes in accordance with the number of input signals sequentially input over time and the number of resistors 17 (on-resistances) in a state capable of transmitting a signal to the output lines 7. Here, the focus is placed on the time constant at an end $t_n$ of the input period T. As shown in FIG. 7, in the accumulation circuit 25, signals are input into all of the input signal lines (synapse circuits 8) at the end $t_n$ of the input period T. Therefore, the number of input signals at the end $t_n$ of the input period T takes a maximum value and a constant value. As a result, the time constant at the end $t_n$ of the input period T sequentially changes in accordance with the number of on-resistances.

Here, the resistance values of the resistors 17 are set to be the same resistance value R. In other words, a binary connect configuration is employed. Moreover, the parasitic capacitance of each synapse circuit 8 is designed to be a constant capacitance C. Since the resistors 17 are connected in parallel to one output line 7, the combined resistance is R/N in a case where N resistors 17 are connected (the number of on-resistances is N). On the other hand, since the number of synapse circuits 8 is N which is equal to the number of resistors 17, the combined capacitance is NC.

For example, a multiply-accumulate signal is generated on the basis of the parasitic capacitance of each synapse circuit 8 without providing the capacitors 13. In this case, the value of the combined resistance×combined capacitance is RC irrespective of the number of resistors 17 (number of on-resistances). Therefore, the time constant of the output lines 7 at the end $t_n$ of the input period T is also RC irrespective of the number of resistors 17.

In a case where the capacitors 13 are installed, the capacitance of the capacitors 13 is set to a value (number of resistors 17×$C_0$) obtained by multiplying a predetermined constant $C_0$ by the number of resistors 17 (number of on-resistances). Accordingly, the time constant is R/N× (NC+N$C_0$)=R×(C+$C_0$) and is constant irrespective of the number of resistors 17. Thus, the time constant can be made constant irrespective of the number of resistors 17.

Therefore, the potential $V_{out}$ (voltage of the capacitor 13) at the output point P can be approximated by the following expression.

$$V = V_c\left(1 - e^{-\frac{t_{avg}}{R \cdot C}}\right) \qquad \text{[Formula 8]}$$

Here, $V_{in}$ represents a constant which is the convergence value of the voltage and is typically a voltage value (pulse height) of the input signal. The expression (Formula 8) is a function that gradually approaches $V_{in}$ with elapse of time t as shown below. Moreover, the time constant RC is a time at which a voltage $V_{out}$ reaches about 63% of the convergence value $V_{in}$.

In this embodiment, the input period T is set as a period in which a transition state in which the voltage of the capacitor 13 is continuously increased by the input of the electrical signal is provided. It is, for example, a period in which a voltage rises continuously in accordance with the expression (Formula 8) or the like occurs. As will be described later, the configuration devised by the inventor is a circuit that actively utilizes the characteristic of such a transition state.

Figure 8:
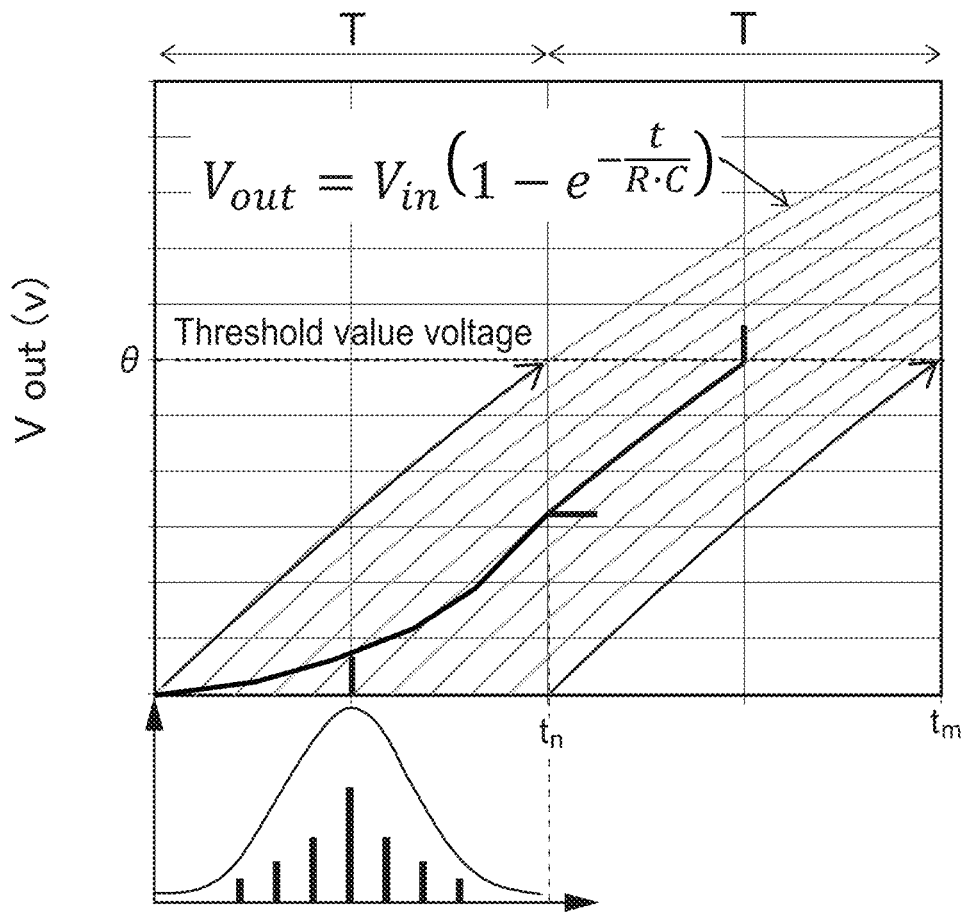
FIG. 8 A schematic graph showing an example of a change over time of a voltage of a capacitor shown in FIG. 7.

FIG. 8 is a schematic graph showing an example of a change of the voltage of the capacitor 13 shown in FIG. 7 over time. The horizontal axis of the graph indicates time and the vertical axis indicates the voltage $V_{out}$ of the capacitor 13.

As shown in FIG. 8, the input period T and the threshold value θ are determined on the basis of the curve corresponding to the expression (Formula 8). That is, $V_{out}$ when the time t=T is set in the expression (Formula 8) is set as the threshold value θ. It should be noted that in FIG. 8, the graph from the start timing of the input period T (t=0) to the end timing of the output period T consecutive to the input period T (t=$t_m$=2T) is shown.

In the accumulation circuit 25 shown in FIG. 7, the voltage of the capacitor 13 at the end timing $t_n$ of the input period T is a result of substituting an average value of pulse widths τ of the input signals input into the respective synapse circuits 8 into the expression (Formula 8). That is, at the end timing $t_n$ of the input period T, a similar potential to that when pulses having a width similar to the average value of pulse widths τ are input into all the synapse circuits 8 is generated at the output point P.

For example, when maximum pulses (τ=T) are input into the respective input signal lines, $V_{out}$ rises from the start timing t=0 of the input period T. In this case, $V_{out}$ increases along the curve corresponding to the expression (Formula 8), and exceeds the threshold value λ at the end timing $t_n$ of the input period T (the start timing of the output period T).

On the other hand, it is assumed that pulses (hereinafter, referred to as minimum pulses) corresponding to a smallest signal value $x_i$ are input into the respective input signal lines. The minimum pulses are, for example, input signals each having a pulse width of 0. In this case, $V_{out}$ rises from the end timing $t_n$ of the input period T and exceeds the threshold value θ at the end timing $t_m$ of the output period T. As a result, it is possible to accurately calculate the multiply-accumulate signal with high resolution in the output period T.

In the actual operation, it is conceivable that input signals having various pulse widths τ shown below are input into the respective synapse circuits 8 in the input period T as shown on the right side of FIG. 7. In FIG. 7, a histogram showing a distribution of those pulse widths is schematically shown.

In a case where the pulse width τ of each input signal is not constant, the voltage of the capacitor 13 (the potential of the output point P) does not necessarily rise along the curve corresponding to the expression (Formula 8), and, for example, as shown in FIG. 8, the potential increases in accordance with the pulse width τ of each input signal. Moreover, after the end timing $t_n$ of the input period T, all the input signals are held in the ON state and charges are supplied from all the synapse circuits 8. Therefore, irrespective of the pulse width of the input signal, the voltage of the capacitor 13 in the output period T rises along the curve corresponding to the expression (Formula 8).

Thus, the voltage of the capacitor 13 can be determined on the basis of the combined time constant RC and the average value of pulse widths τ of the respective input signals. In other words, the voltage of the capacitor 13 can be regarded as one that rises along the curve corresponding to the expression (Formula 8), starting point from the timing obtained by subtracting the average value of the pulse widths τ of the respective input signals from the input period T.

Figure 9:
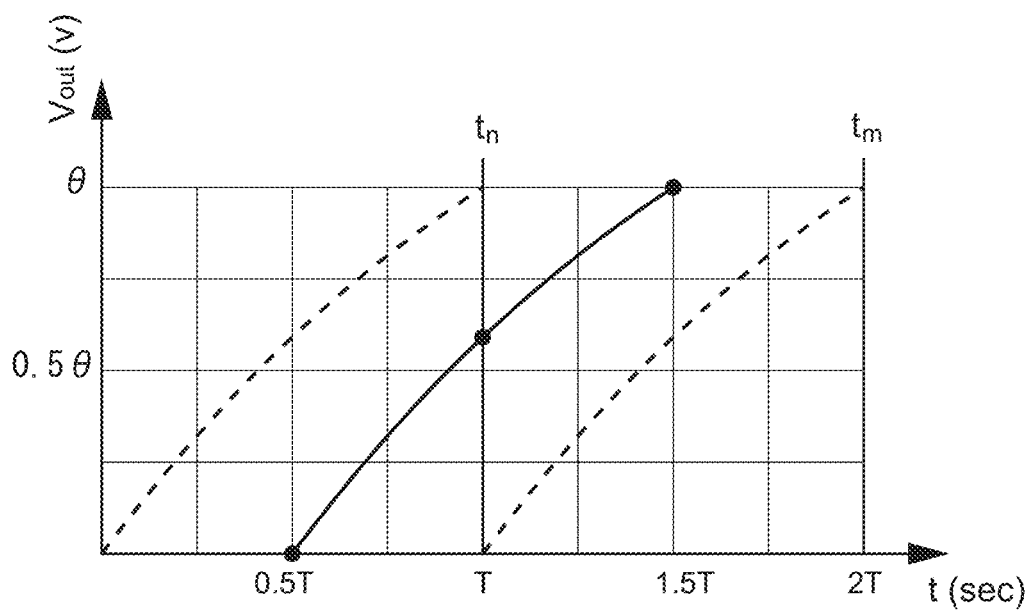
FIG. 9 A schematic graph for describing a voltage of the capacitor at an end timing of an input period.

FIG. 9 is a schematic graph for describing the voltage of the capacitor 13 at the end timing of the input period T. The vertical axis of the graph indicates the voltage $V_{out}$ of the capacitor 13 and the horizontal axis of the graph indicates the time t. This graph is, for example, a graph equivalent to the graph shown in FIG. 8.

For example, it is assumed that the average value of pulse widths τ (signal values $x_i$) of the input signals is 50% of the maximum pulse. In this case, the voltage of the capacitor 13 can be regarded as one that rises along the curve corresponding to the expression (Formula 8) from an intermediate timing (t=0.5 T) of the input period T.

Therefore, the timing at which the voltage of the capacitor 13 exceeds the threshold value θ is an intermediate timing (t=1.5 T) of the output period T. It is a timing corresponding to 50% of the maximum value of the multiply-accumulate result. That is, it can also be said that the input signal representing the signal value $x_i$ by the time (pulse width) is linearly converted into the multiply-accumulate signal representing the multiply-accumulate result by the time (pulse width).

Here, the voltage of the capacitor 13 at the end timing $t_n$ of the input period T (the voltage of the capacitor) will be discussed. As described above, the signal values $x_i$ represented by the input signals correspond to the pulse widths τ of the input signals in the input period T. Therefore, at a time at which the input period T ends, the accumulation of charges for calculating the multiply-accumulate result is completed, and it is possible to handle the voltage of the capacitor 13 at that time as the multiply-accumulate result. That is, the multiply-accumulate signal representing the multiply-accumulate result by the voltage can be generated from the voltage of the capacitor 13 at the end timing $t_n$.

On the other hand, the multiply-accumulate result expressed by using the voltage of the capacitor 13 at the end timing $t_n$ includes a distortion associated with the time constant of the expression (Formula 8). For example, in a case where the average value of pulse widths of the respective input signals is 50% of the maximum pulse, the voltage of the capacitor 13 at the end timing $t_n$ of the input period T is larger than the value (0.5 θ) of 50% of the voltage (threshold value θ) representing the maximum value of the multiply-accumulate result at the end timing tn. That is, it can also be said that the input signal representing the signal values $x_i$ by the time (pulse width) is non-linearly converted into the multiply-accumulate signal representing the multiply-accumulate result by the voltage.

For example, in the example shown in FIG. 6 has been described by assuming the case where charges are accumulated linearly. However, in the actual circuit, it can be considered that the voltage of the capacitor 13 increases non-linearly in accordance with the curve depending on the time constant. Therefore, the accuracy of the multiply-accumulate operation may be lowered in a case of using the multiply-accumulate signal representing the multiply-accumulate result by the voltage.

The inventor found a configuration to reduce the distortion of the voltage of the capacitor 13 (potential of the output point P) associated with such non-linearity and properly output the multiply-accumulate signal representing the multiply-accumulate result by the voltage. Hereinafter, a concrete description will be given.

Figure 10:
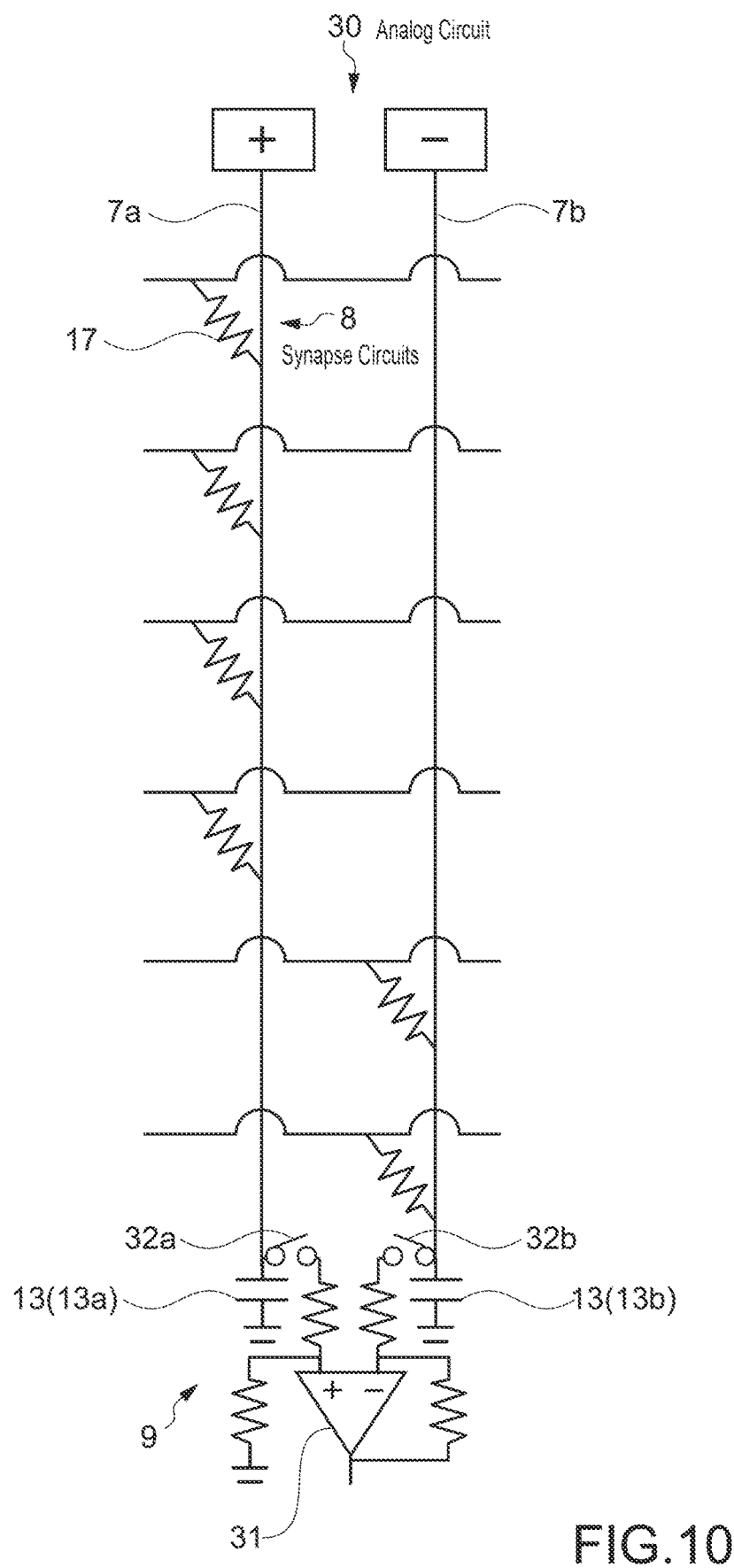
FIG. 10 A circuit diagram showing a configuration example of an analog circuit according to this embodiment.

FIG. 10 is a circuit diagram showing a configuration example of an analog circuit according to this embodiment. An analog circuit 30 has a configuration in which a differential amplifier 31 is used as the signal output unit 12 in the neuron circuit 9 described above with reference to FIGS. 4 and 5, for example. In FIG. 10, the parasitic capacitance C in each synapse circuit 8 is not shown. It should be noted that an analog memory and a comparator or the like to be described later (see FIG. 14) are connected to the subsequent stage of the differential amplifier 31.

As shown in FIG. 10, the capacitor 13*a* that accumulates positive weight charges is connected to the positive charge output line 7*a* and the capacitor 13*b* that accumulates negative weight charges is connected to the negative charge output line 7*b*. Therefore, the potential of the positive charge output line 7*a* is the voltage (positive weight voltage $V_+$) of the capacitor 13a and the potential of the negative charge output line 7b is the voltage (negative weight voltage $V_-$) of the capacitor 13b.

As described above, the voltage of the capacitor 13 is the voltage representing the multiply-accumulate result in the respective synapse circuits 8 connected to the capacitor 13. That is, the positive weight voltage $V_+$ retained by the capacitor 13a represents the multiply-accumulate result of the positive weight charges and the negative weight voltage $V_-$ retained by the capacitor 13b represents the multiply-accumulate result of the negative weight charges.

In the neuron circuit 9 of the analog circuit 30, a voltage signal representing the total multiply-accumulate result of the analog circuit including both positive and negative values is generated on the basis of the positive weight voltage $V_+$ and the negative weight voltage $V_-$. Moreover, the multiply-accumulate signal is output using this voltage signal. That is, the neuron circuit 9 is a circuit that generates a voltage signal representing a sum of the product values by the voltage on the basis of the voltage of the capacitor 13 and outputs a multiply-accumulate signal on the basis of the voltage signal.

It should be noted that, in the present disclosure, the multiply-accumulate signal is a signal representing the multiply-accumulate result, and the method of representing the multiply-accumulate result and the like are not limited. For example, as described above, the signal representing the multiply-accumulate result by the time information (such as the pulse width and the input timing) and the signal representing the multiply-accumulate result by the voltage value are both included in the multiply-accumulate signal. Therefore, the voltage signal described above is also an example of the multiply-accumulate signal.

The differential amplifier 31 is an element that has a positive input terminal and a negative input terminal, and amplifies and outputs the differential voltage between the potential of the positive input terminal and the potential of the negative input terminal. In FIG. 10, the "+" side is the positive input terminal and the "−" side is the negative input terminal. The positive charge output line 7a is connected to the positive input terminal via a switch 32a and the negative charge output line 7b is connected to the negative input terminal via a switch 32b. The switches 32a and 32b are ON while, for example, first multiply-accumulate processing is performed, and are turned off at the end of the processing.

It should be noted that resistors for setting the amplification factor are connected to the differential amplifier 31. For example, it is possible to adjust the amplification factor by changing the resistance values of those resistors. The amplification factor of the differential voltage is not limited, and, for example, may be set as appropriate such that the output of the differential amplifier 31 can be properly detected.

The differential amplifier 31 amplifies the differential voltage between the potential of the positive charge output line 7a and the potential of the negative charge output line 7b at a predetermined amplification factor. This differential voltage is a differential voltage ($\Delta V = V_+ - V_-$) between the positive weight voltage $V_+$ and the negative weight voltage $V_-$ and is a voltage representing the total multiply-accumulate result of the analog circuit including both positive and negative values. That is, the differential amplifier 31 generates a voltage signal by amplifying the differential voltage $\Delta V$ at the predetermined amplification factor. Accordingly, it is possible to accurately detect the differential voltage $\Delta V$, and it is possible to reduce the noise level.

Thus, the neuron circuit 9 (differential amplifier 31) generates a voltage signal on the basis of the differential voltage between the positive weight voltage $V_+$ retained in the capacitor 13a and the negative weight voltage $V_-$ retained in the capacitor 13b. Accordingly, for example, it is possible to obtain the voltage representing the total multiply-accumulate result by using the single differential amplifier 31, and it is possible to sufficiently simplify the circuit configuration.

It should be noted that the present technology is not limited to the case where the differential amplifier 31 is provided, and, for example, a circuit or the like that amplifies the positive weight voltage $V_+$ and the negative weight voltage $V_-$ at the same amplification factor and then detects a differential voltage may be used. Alternatively, a circuit (voltage follower or the like) having an amplification factor of 1, which outputs a differential voltage without amplifying the differential voltage, may be used. In addition, the method of generating the voltage signal and the like are not limited.

Figure 11:
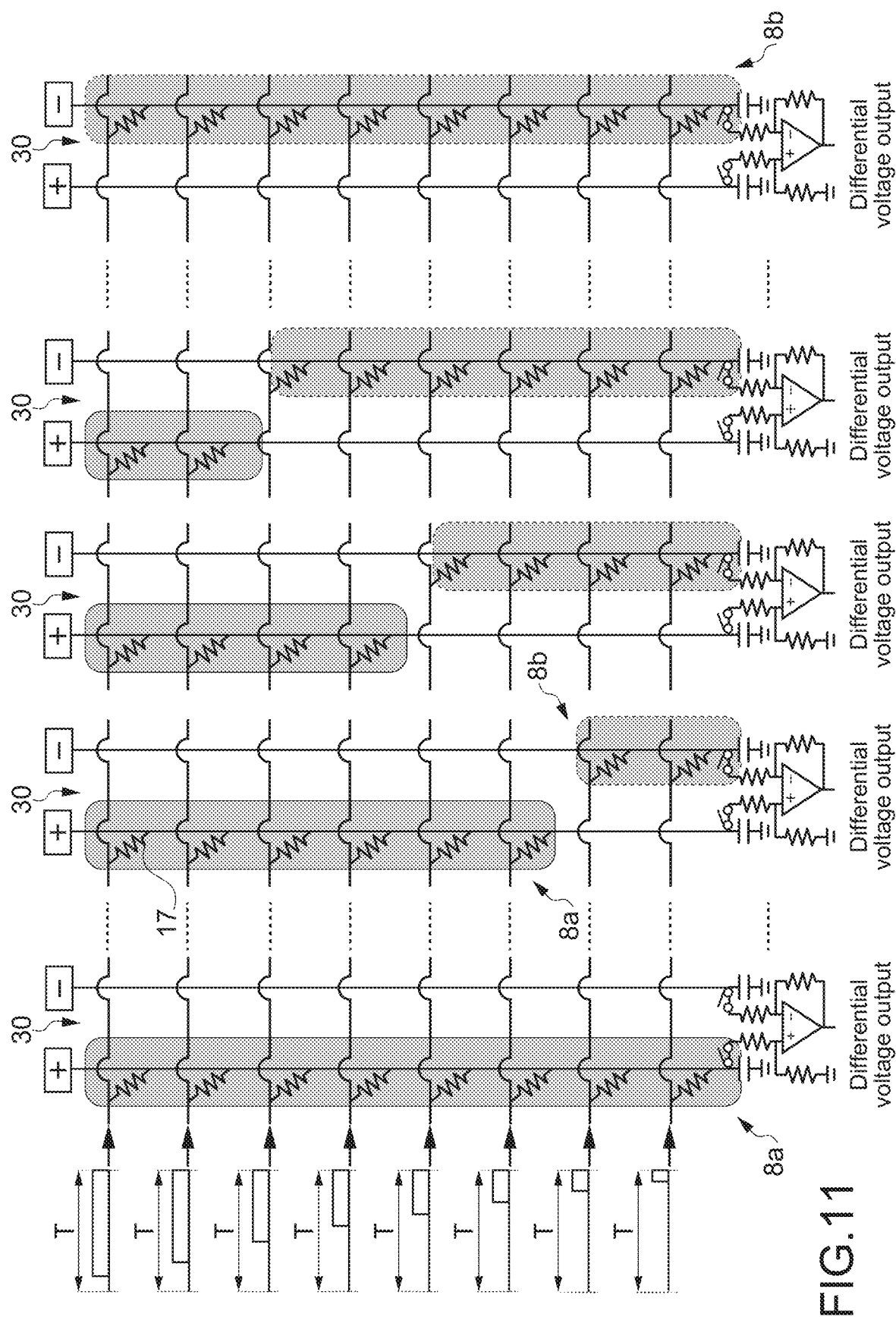
FIG. 11 A schematic diagram showing a configuration example of a plurality of analog circuits included in one layer.

FIG. 11 is a schematic diagram showing a configuration example of a plurality of analog circuits 30 included in one layer. In FIG. 11, the plurality of analog circuits 30 connected in parallel with respect to the plurality of input signal lines input into one layer is schematically shown.

In the analog circuit 30, the plurality of synapse circuits 8 includes at least one of a synapse circuit 8a that generates positive weight charges each obtained by multiplying the signal value by the positive weight value and a synapse circuit 8b that generates negative weight charges each obtained by multiplying the signal value by the negative weight value, and is configured such that a ratio of a sum total ($|w_i| \times 8$ in FIG. 11) of the positive weight values to a sum total of absolute values of the weight values $w_i$ is any ratio of 0% and 100%. Hereinafter, the synapse circuit 8a will be referred to as a positive weight, and the synapse circuit 8b will be referred to as a negative weight in some cases.

For example, in the example shown in FIG. 11, the analog circuit 30 at the left end includes only the synapse circuit 8a (positive weight) that generates positive weight charges and the ratio of the sum total of the positive weight values is 100% to a sum total of absolute values of all the weight values $w_i$. Moreover, the analog circuit 30 at the right end includes only the synapse circuit 8b (negative weight) that generates negative weight charges and the ratio of the sum total of the positive weight values is 0% to the sum total of the absolute values of all the weight values $w_i$. Other analog circuits 30 each include both positive and negative weights.

Moreover, the plurality of analog circuits 30 is configured such that the sum totals of the absolute values of the weight values $w_i$ of the plurality of synapse circuits 8 that the analog circuits 30 respectively include are equal to each other. That is, the sum total of the absolute values of the positive and negative weight values $w_i^+$ and included in each analog circuit 30 is set to take a constant value.

In this embodiment, each analog circuit 30 has the binary connect configuration. That is, the positive weight value $w_i^+$ and the absolute values of the negative weight value are fixed to the same value, and the resistor 17 of each synapse circuit 8 is set to have the same resistance value R irrespective of whether it is positive or negative. Moreover, the plurality of analog circuits 30 is configured such that the total number of synapse circuits 8 that each analog circuit 30 includes is equal to each other. For example, in a configuration in which N input signals are input, the total number of synapse circuits 8 is set to N in any of the analog circuits 30. That is, the total number of positive and negative weights is set to be equal to N.

It should be noted that a synapse circuit 8 (zero weight) whose weight value $w_i$ has been set to 0 can also be set in each analog circuit 30. In this case, in order to satisfy the above-mentioned condition, the number of zero weights set in each of the analog circuits 30 is set to be equal to the number of zero weights set in another one. For example, in a case where a single zero weight is set in one of the analog circuits 30, a single zero weight is set in each of all other analog circuits 30. Accordingly, the total number of positive and negative synapse circuits 8a and 8b is maintained at the constant value.

Figure 12:
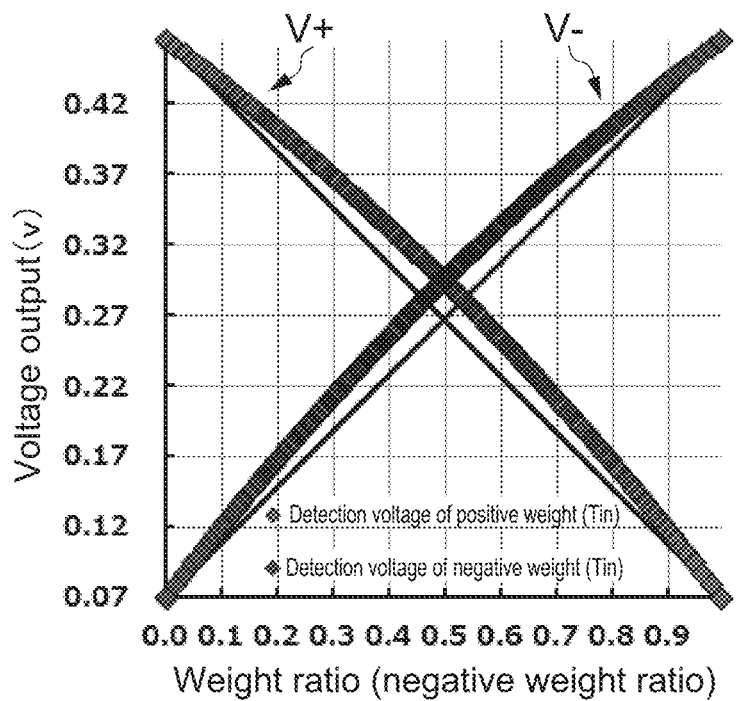
FIG. 12 A graph showing an example of the relationship between a positive weight voltage and a negative weight voltage and a positive and negative weight ratio.

FIG. 12 is a graph showing an example of the relationship between the positive weight voltage and the negative weight voltage and the positive and negative weight ratio. The vertical axis of the graph indicates the positive weight voltage (negative weight voltage) and the horizontal axis indicates the weight ratio. The weight ratio is the number of negative weights/the total number of positive and negative weights N, and is a ratio of the weight negatives. For example, in a case where the weight ratio is 0.4, it means that the ratio of the negative weights is 40% of the whole. It should be noted that in the graph of FIG. 12, the voltage at the end timing of the input period T is plotted in a case where a group of pulses (a set of input signals) each satisfying a specified predetermined condition is input into all the synapse circuits 8 of the analog circuit 30 at all weight ratios of the horizontal axis of FIG. 12 with the same settings.

For example, the positive weight voltage $V_+$ takes a maximum value in a case where the weight ratio is 0 (the ratio of the positive weights is 100%) and takes a minimum value of 0 in a case where the weight ratio is 1 (the ratio of the positive weights is 0%). At this time, a distortion is produced in the positive weight voltage $V_+$ due to the non-linearity described above with reference to FIG. 9 and the like. Specifically, the positive weight voltage $V_+$ exhibits a characteristic in which the positive weight voltage is deformed into an arcuate shape so as to take a value larger than a straight line connecting the maximum value and the minimum value.

Similarly, a distortion due to the non-linearity is also produced in the negative weight voltage $V_-$. As shown in FIGS. 10 and 11, the circuit that generates the negative weight voltage $V_-$ can be regarded as a circuit equivalent to the circuit that generates the positive weight voltage $V_+$. For this reason, a characteristic that the negative weight voltage $V_-$ is bilaterally symmetrical with the positive weight voltage $V_+$ at a weight ratio of 0.5 as a boundary is exhibited.

Figure 13:
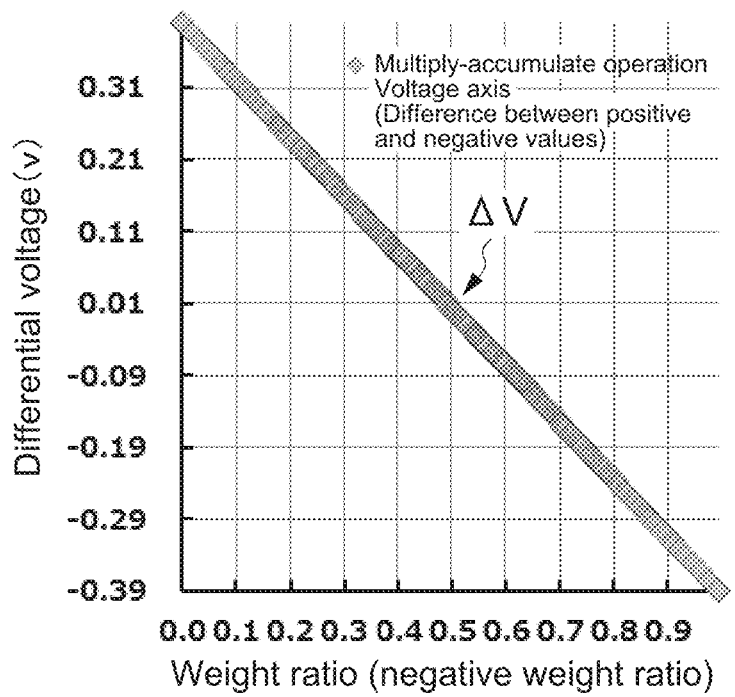
FIG. 13 A graph showing an example of the relationship between a differential voltage and the positive and negative weight ratio.

FIG. 13 is a graph showing an example of the relationship between the differential voltage and the positive and negative weight ratio. The vertical axis of the graph indicates the positive weight voltage (negative weight voltage) and the horizontal axis indicates the weight ratio (ratio of negative weights). In FIG. 13, the differential voltage $\Delta V$ between the positive weight voltage $V_+$ and the negative weight voltage $V_-$ shown in FIG. 12 is plotted.

As shown in FIG. 13, the differential voltage $\Delta V$ varies substantially linearly with respect to the weight ratio. That is, by taking the difference between the positive weight voltage $V_+$ and the negative weight voltage $V_-$, the distortion of the voltage due to the non-linearity as shown in FIG. 12 is reduced. Therefore, the differential voltage $\Delta V$ can be regarded as a voltage that varies substantially linearly with respect to the input signal irrespective of the number of weights.

As shown in FIG. 12, for example, at a certain weight ratio, the amount of distortion of the positive weight voltage $V_+$ and the amount of distortion of the negative weight voltage $V_-$, i.e., amounts of deviation from the straight line connecting the maximum value and the minimum value have values substantially similar to each other. Therefore, it can be considered that their distortion amounts are cancelled by taking the difference between the positive weight voltage $V_+$ and the negative weight voltage $V_-$, and thus the distortion amount of the differential voltage $\Delta V$ is reduced.

It should be noted that in the analog circuit 30 in which the total number of positive weights and negative weights is different from the others, the relationship shown in FIG. 12 is not established. In this case, for example, the distortion amounts of the positive weight voltage $V_+$ and the negative weight voltage $V_-$ are not symmetrical, and it can be considered that it is difficult to cancel the respective distortions.

In this way, by configuring the total number of positive and negative weights included in the plurality of analog circuits 30 (the total number of synapse circuits 8a and 8b) to be equal, it is possible to reduce the distortion of the differential voltage $\Delta V$. Moreover, by using the differential voltage $\Delta V$ whose distortion has been suppressed, it is possible to easily calculate the multiply-accumulate signal or the like corresponding linearly to the input signal.

In the analog circuit 30, the total multiply-accumulate result can be obtained at a time at which the differential voltage $\Delta V$ is detected. That is, a signal representing the multiply-accumulate result can be generated at a timing similar to the timing of the end of the input period T. Therefore, in the output period T successive to the input period T, it is unnecessary to perform the charging or the like of the capacitor 13 and the input signal does not need to maintain the ON state also after the input period T.

As shown in FIG. 11, an input signal or the like to be OFF at the end timing of the input period T is input into the analog circuit 30, for example. Thus, in this embodiment, the input signal has a pulse width corresponding to the period from the timing corresponding to the signal value in the input period T to the end timing of the input period. This signal is a signal whose rising timing corresponds to the signal value, for example, and whose pulse width corresponds to the signal value.

Figure 14:
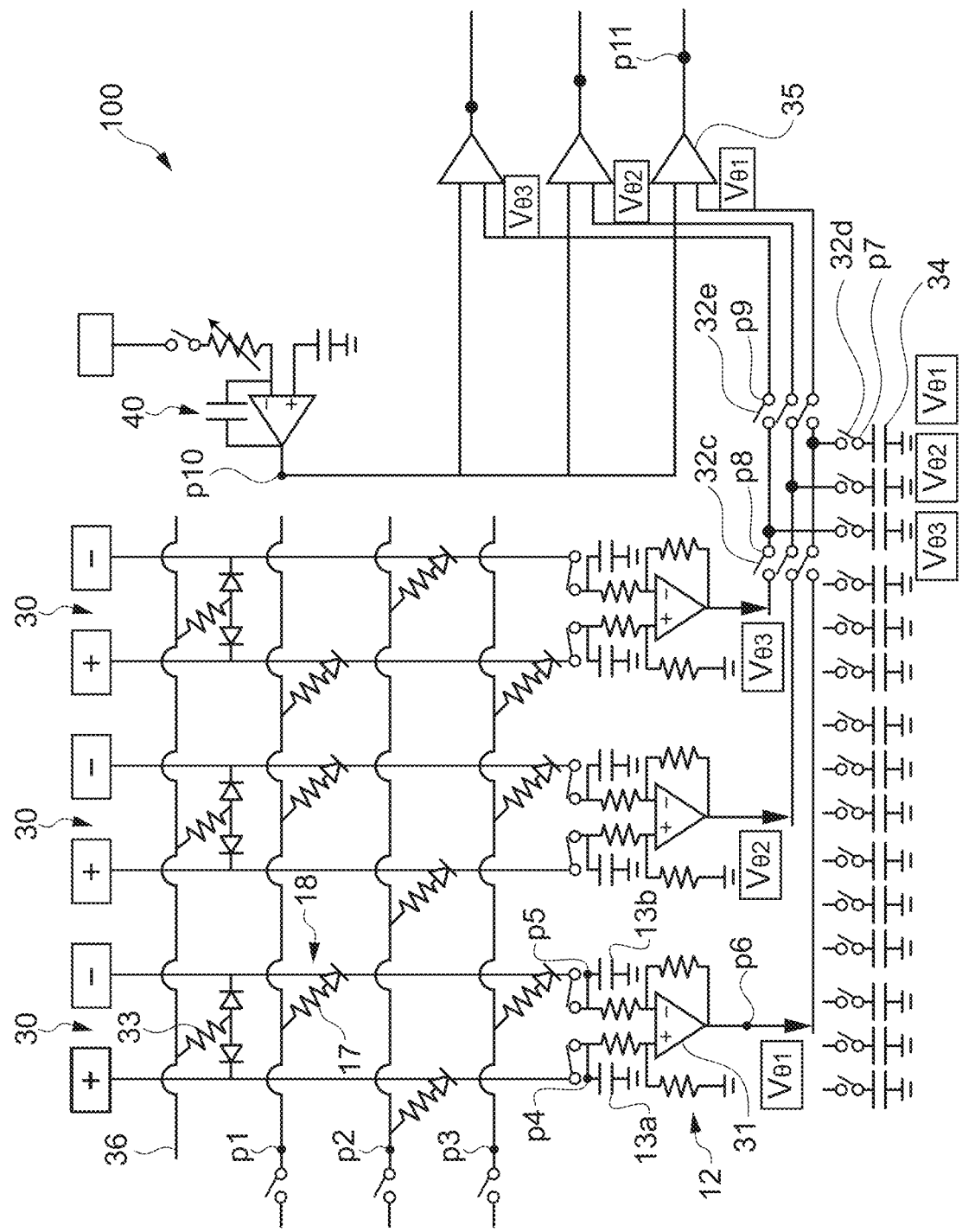
FIG. 14 A circuit diagram showing a specific configuration example of the arithmetic apparatus according to this embodiment.

FIG. 14 is a circuit diagram showing a specific configuration example of the arithmetic apparatus 100 according to this embodiment. The arithmetic apparatus 100 includes a plurality of input signal lines 6, a plurality of analog circuits 30, and an integration circuit 40. FIG. 14 shows a configuration with three input signal lines 6a to 6c. As a matter of course, the number of input signal lines 6, i.e., the total number of weights or the like can be set as appropriate.

The analog circuit 30 is a circuit described with reference to FIG. 10 and the like. The analog circuit 30 further has an offset resistor 33. Moreover, the neuron circuit 9 (output unit) of the analog circuit 30 further includes an analog memory 34 and a comparator 35. It should be noted that the illustrations of the offset resistor 33, the analog memory 34, and the comparator 35 are omitted from the analog circuit 30 shown in FIG. 10 or the like. Moreover, in FIG. 14, a resistor having diode characteristics is used as the resistor 17 constituting each synapse circuit 8.

The offset resistor 33 is connected between a predetermined power supply line 36 and the positive charge output line 7a and the negative charge output line 7b. The offset resistor 33 is a resistor for increasing the voltage of the capacitor 13 to a predetermined offset value. By setting the offset value, it is possible to properly read the voltage value even if the voltage of the capacitor 13 is low.

The analog memory 34 is connected to the output terminal of the differential amplifier 31 via a switch 32c and a switch 32d. Moreover, the analog memory 34 is connected to the comparator 35 via a switch 32e. The analog memory 34 holds the voltage of the electrical signal generated by the differential amplifier 31. As the analog memory 34, for example, a capacitor or the like having a predetermined capacitance is used. In addition, any memory element that readably holds the voltage of the electrical signal may be used as the analog memory 34.

The comparator 35 performs threshold determination of a ramp voltage to be described later by using the voltage of the electrical signal output from the differential amplifier 31 as a threshold value, to thereby output a multiply-accumulate signal. In this case, a multiply-accumulate signal representing the multiply-accumulate result, which is represented by the voltage of the electrical signal, by the time information is output from the comparator 35. The multiply-accumulate signal output from the comparator 35 is used as an input signal of the subsequent layer, for example.

The integration circuit 40 provides the ramp voltage to the neuron circuit 9 of each of the plurality of analog circuits 30. Specifically, the ramp voltage is supplied to the comparator 35 of each neuron circuit 9. Moreover, the integration circuit 40 is configured to be capable of changing the slope of the ramp voltage. It should be noted that the specific configuration of the integration circuit 40 is not limited. In this embodiment, the integration circuit 40 corresponds to a voltage supply unit.

Figure 15:
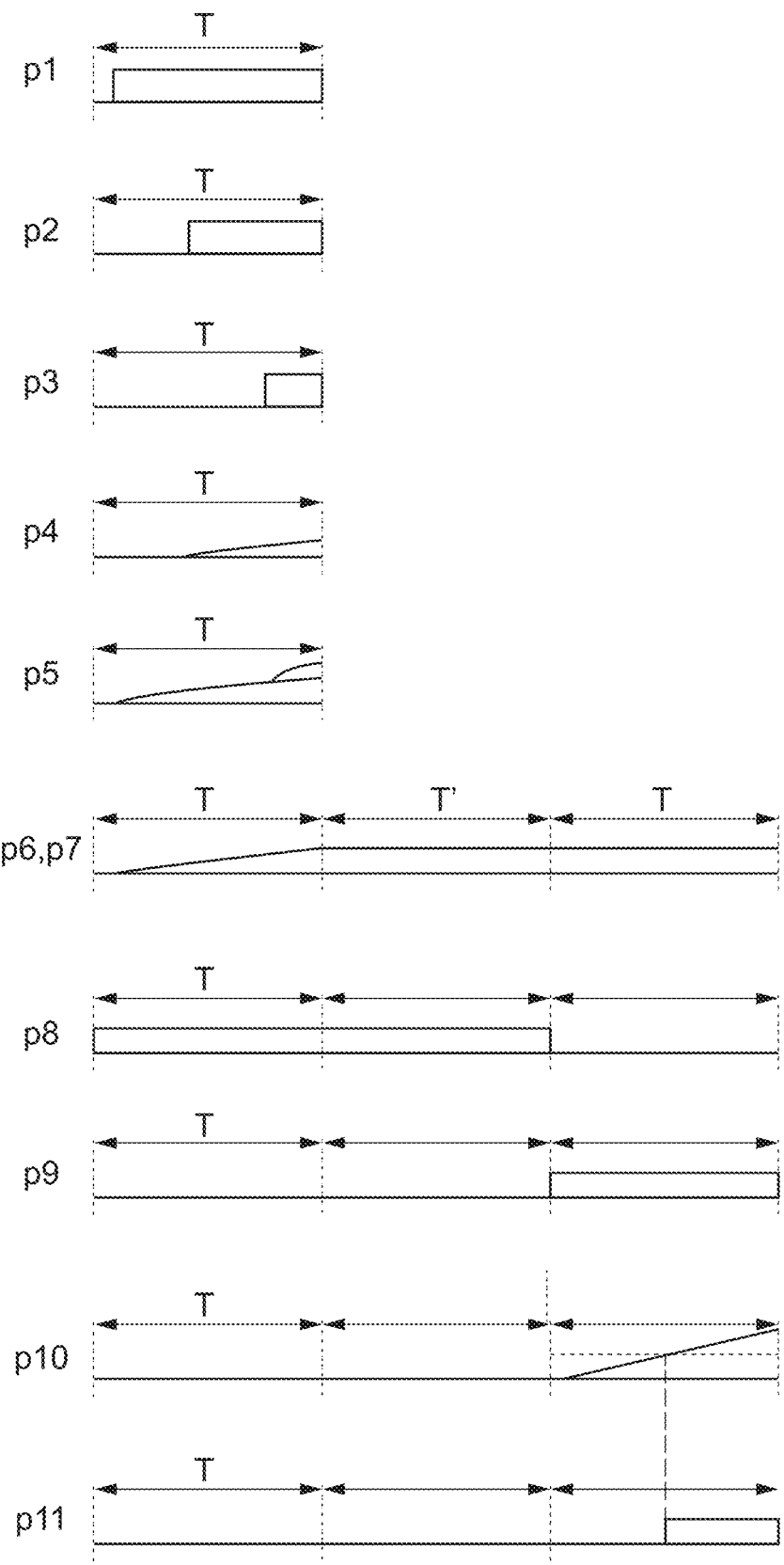
FIG. 15 A timing chart showing an example of the operation of the arithmetic apparatus.

FIG. 15 is a timing chart showing an example of the operation of the arithmetic apparatus 100. In FIG. 15, a timing chart showing changes in voltage at points p1 to p11 shown in FIG. 14 is shown. Hereinafter, the operation of the arithmetic apparatus 100 will be described with reference to FIG. 15.

The points p1 to p3 are points on input signal lines 6a, 6b, and 6c, respectively. The points p4 and p5 are output points of capacitors 13a and 13b of the analog circuit 30 at the left end. The point p6 is an output of the differential amplifier 31 and the point p7 is an output of the analog memory 34. The point p8 is a control terminal of the switches 32c and 32d and the point p9 is a control terminal of the switch 32e. The point p10 is an output of the integration circuit 40 and the point p11 is an output of the comparator 35.

First, input signals $S_a$, $S_b$, and $S_c$ are input into the input signal lines 6a, 6b, and 6c in the input period T. It should be noted that in the example shown in FIG. 15, the input timings of the respective input signals are timings earlier in the order of the input signals $S_a$, $S_b$, and $S_c$.

For example, in the analog circuit 30 at the left end, a positive weight (synapse circuit 8a) is connected to the input signal line 6b and a negative weight (synapse circuit 8b) is connected to the input signal lines 6a and 6c. Therefore, in the analog circuit 30 at the left end, the voltage (p4) of the positive capacitor 13a rises at the same time as the input timing of the input signal $S_b$. Moreover, the voltage (p5) of the negative capacitor 13b starts to rise at the same time as the input timing of the input signal $S_a$. Moreover, accumulation of charges corresponding to the input signals $S_a$ and $S_c$ is started from the input timing of the input signal $S_c$.

During the input period T, the differential amplifier 31 is connected to the positive charge output line 7a and the negative charge output line 7b. Therefore, a voltage signal having a voltage whose differential voltage ΔV has been amplified at the predetermined amplification factor is output from the output of the differential amplifier 31 (p6). Moreover, during the input period T, the control terminal (p8) of the switch 32c and the switch 32d is set to be in the ON state and the switch 32c and the switch 32d are turned on. Therefore, the voltage signal output from the differential amplifier 31 is input into the analog memory 34 (p7). It should be noted that the switch 32e is OFF in the input period T.

At the end timing of the input period T, the input signals $S_a$, $S_b$, and $S_c$ are zero. At this point of time, the capacitor 13a and the capacitor 13b hold the positive weight voltage $V_+$ representing the multiply-accumulate result of the positive weight charges and the negative weight voltage $V_-$ representing the multiply-accumulate result of the negative weight charges. Therefore, when the input period T has elapsed, a voltage signal representing the total multiply-accumulate result is output from the differential amplifier 31.

In the example shown in FIG. 15, a constant standby time T' is provided after the input period T. During the standby time T', the voltage representing the total multiply-accumulate result is temporarily retained by the analog memory 34. Moreover, the voltage of the analog memory 34 is referenced as appropriate at the start timing of the output period T (at the end timing of the standby time T'). Thus, the voltage of the voltage signal is temporarily stored in this embodiment.

Accordingly, for example, it is possible to refer to the voltage representing the multiply-accumulate result as appropriate. As a result, it is possible to easily realize matching of processing timing with other arithmetic processing, for example. Moreover, the voltage of the voltage signal can be stored using a single capacitor or the like, and it is possible to sufficiently simplify the circuit configuration.

When the output period T is started, the ramp voltage that changes at a predetermined slope is output from the integration circuit 40. In FIG. 15, a ramp voltage having a positive slope in which the voltage rises linearly at the same time as the start of the output period T is output.

Moreover, the switch 32c and the switch 32d are turned off and the switch 32e is turned on. As a result, the voltage of the voltage signal stored in the analog memory 34 is output as a threshold value of the comparator 35. Threshold determination of the ramp voltage using the voltage of the voltage signal, i.e., the total multiply-accumulate result as the threshold value is performed in the comparator 35.

Figure 16:
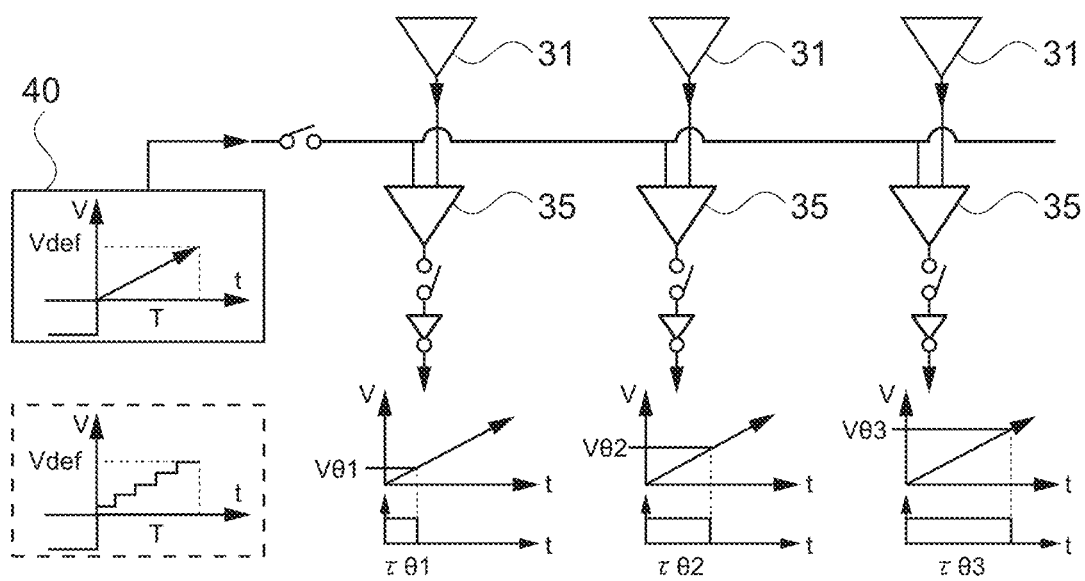
FIG. 16 A schematic diagram showing an example of threshold determination of a ramp voltage.
Figure 17:
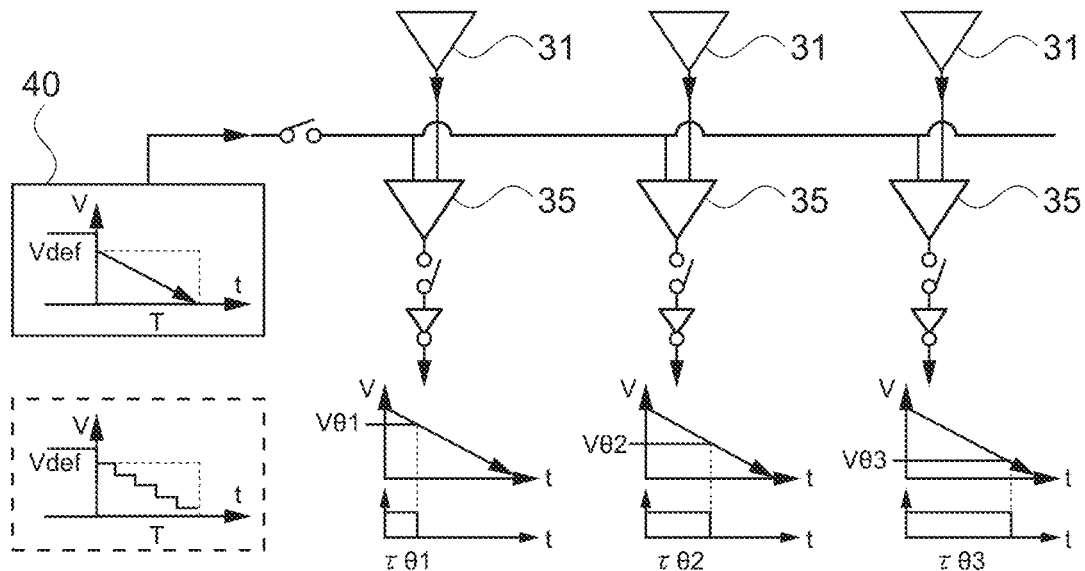
FIG. 17 A schematic diagram showing an example of the threshold determination of the ramp voltage.

FIGS. 16 and 17 are schematic diagrams each showing an example of the threshold determination of the ramp voltage. In the example shown in FIG. 16, a ramp voltage whose slope is positive, i.e., a voltage that increases at a constant rate is output by the integration circuit 40. In FIG. 16, three pairs of the differential amplifier 31 and the comparator 35 are shown. Each pair is a configuration of the subsequent stage of each analog circuit 30 shown in FIG. 14.

The graph surrounded by the solid line in FIG. 16 is an example of a continuously rising ramp voltage. Moreover, the graph surrounded by the dotted line is an example of the ramp voltage rising with steps like stairs. Whichever ramp voltage is used, the present technology can be applied. Hereinafter, the threshold determination for the ramp voltage will be described by showing the continuously rising ramp voltage.

The ramp voltage is generated such that the voltage increases at a predetermined slope from the start timing of the output period T. Here, it is assumed that a ramp voltage which is 0V at the start timing of the output period T and rises to a default voltage $V_{def}$ at the end timing of the output period T is generated. The slope β of the ramp voltage at this time, $β = V_{def}/T$.

The method of setting the default voltage $V_{def}$, i.e., the default slope β or the like is not limited. For example, the slope β or the like is set such that the output of the differential amplifier 31 can be properly determined in accordance with the magnitude of the assumed differential voltage ΔV, the amplification factor of the differential amplifier 31, and the like.

It should be noted that before the start timing, the output of the integration circuit 40 is set to a value lower than 0V. Accordingly, the comparator 35 at the subsequent stage is supplied with a sufficiently low voltage, and it is possible to suppress malfunction of the comparator 35 due to noise or the like, for example.

A graph showing a signal input into each comparator 35 and the multiply-accumulate signal output by the threshold determination of each comparator 35 is shown below each comparator 35. In FIGS. 16, Vθ1, Vθ2, and Vθ3 are input into the comparator 35 at the left end, the center, and the right end as the voltages (threshold values Vθ) of the electrical signals, respectively. The comparators 35 are sequentially fired at a timing at which the ramp voltage increases beyond the threshold value Vθ, and the logical state of the output is switched.

For example, a signal to be at a high level at a timing at which it exceeds the threshold value Vθ is output in the comparator 35 shown in FIG. 16. Moreover, an inverter (NOT circuit) is provided via a switch at the subsequent stage of the comparator 35. During the output period T, the switch connecting the comparator 35 and the inverter is set to be in the ON state. It should be noted that the illustration of the inverter is omitted from in FIG. 14.

The output of the comparator 35 is inverted by the inverter. As a result, a signal that has a high level until it exceeds the threshold value Vθ from the start timing of the output period T is output as shown in FIG. 16. This signal is a multiply-accumulate signal representing the total multiply-accumulate result by the pulse width (width of the high level).

Moreover, the multiply-accumulate signal can be generated even in a case where the inverter is not provided. In this case, a multiply-accumulate signal representing the total multiply-accumulate result by the width of the low level is generated. It should be noted that it can also be said that the signal representing total multiply-accumulate result by the width of the low level is a signal representing the multiply-accumulate result by the rising timing. That is, it can also be said that in a case where the inverter is not provided in FIG. 16, a multiply-accumulate signal according to the TACT method, which represents a sum of product values by a timing in the output period T, is generated.

Moreover, the comparator 35 itself may be configured to be at the low level at a timing at which it exceeds the threshold value θ. Accordingly, the multiply-accumulate signal as shown in FIG. 16 can be generated without providing the inverter. In addition, the method of generating the multiply-accumulate signal by threshold processing, the form of the multiply-accumulate signal, and the like are not limited.

Alternatively, a plurality of multiply-accumulate signals of different types described above may be generated.

As described above, the comparator 35 outputs a multiply-accumulate signal on the basis of the timing at which the ramp voltage increases beyond the voltage of the voltage signal. That is, it can also be said that the comparator 35 converts the voltage signal representing the multiply-accumulate result of the total multiply-accumulate result by the voltage into the multiply-accumulate signal representing the multiply-accumulate result by the time information.

In the example shown in FIG. 17, the integration circuit 40 outputs the ramp voltage whose slope is negative, i.e., a voltage that decreases at a constant rate. The graph surrounded by the solid line in FIG. 17 is an example of a ramp voltage that drops continuously. Moreover, the graph surrounded by the dotted line is an example of a ramp voltage that drops with steps like stairs. The present technology can be applied even in a case where the ramp voltage drops in that way.

For example, the ramp voltage is generated such that the voltage decreases at a predetermined slope from the start timing of the output period T. Here, a ramp voltage which is a default voltage $V_{def}$ at the start timing of the output period T and rises to 0V at the end timing of the output period T is generated. Regarding the slope β of the ramp voltage at this time, $β=-V_{def}/T$ is established.

When the ramp voltage decreases, the comparator 35 outputs a multiply-accumulate signal on the basis of a timing at which the ramp voltage decreases beyond the voltage of the voltage signal. Accordingly, the comparator 35 is capable of converting the voltage signal representing the total multiply-accumulate result by the voltage into the multiply-accumulate signal representing the multiply-accumulate result by the time information.

Thus, in the arithmetic apparatus 100, the voltage signal representing the total multiply-accumulate result by the voltage is generated. The generated voltage signal is converted into the multiply-accumulate signal representing the sum of the product values by the timing or the pulse width in the output period T. Accordingly, it is possible to easily generate a multiply-accumulate signal to be output to a circuit or the like at the subsequent stage. Moreover, it is possible to simplify the configuration for converting the multiply-accumulate signal using the time information (timing, pulse width, or the like) by using a voltage signal. Thus, it is possible to employ a simple configuration, and it is possible to reduce the power consumption of the entire apparatus.

Figure 18:
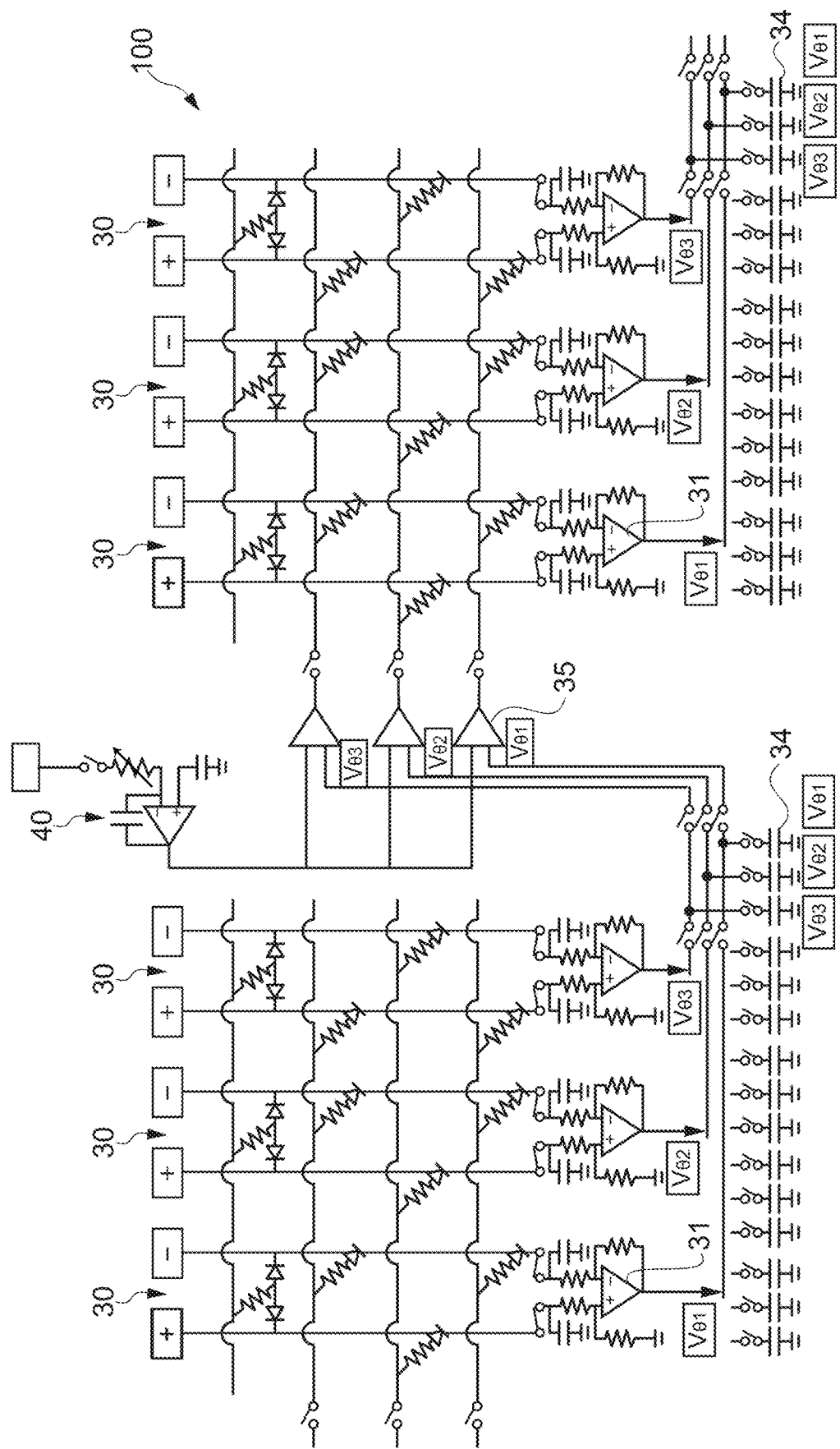
FIG. 18 A circuit diagram a connection example of the arithmetic apparatus.

FIG. 18 is a circuit diagram showing a connection example of the arithmetic apparatus 100. As shown in FIG. 6, the multiply-accumulate signal generated by the comparator 35 is used as an input signal of an upper layer connected to the subsequent stage. In the example shown in FIG. 18, circuits for two layers are shown, though not limited thereto as a matter of course, and connection of three layers or four layers is possible.

Moreover, a determination processing period of the comparator 35, i.e., the output period T of the multiply-accumulate signal is an input period T in which the input signal is input into the analog circuit 30 at the subsequent stage. In the arithmetic apparatus 100, as described above, the voltage of the voltage signal is stored in the analog memory 34, and thus, it is unnecessary to make the input period T and the output period T continuous with each other in one layer. Accordingly, the output period T, i.e., the input period T for the subsequent stage can be set at an arbitrary timing.

For example, in a case where a plurality of analog circuits 30 is configured in cascade, it is typically necessary to perform intermediate operations such as normalization and pooling of input signals between the cascaded analog circuits 30. Therefore, a circuit pr the like (not shown) for performing those operations is provided between the layers. In this case, there is a possibility that a configuration for adjusting the timing of the intermediate operation or the like is further necessary.

In this embodiment, since the multiply-accumulate result is stored as the voltage, it is possible to sufficiently simplify the configuration for performing storage and reading. Moreover, the input period T for the subsequent stage can be set at an arbitrary timing. Accordingly, it is possible to easily match the timings and the like of the intermediate operations without complicating the circuits. Moreover, for example, it is possible to make a setting not to perform output processing until operations of the subsequent stage or operations of the other circuits are completed, and the apparatus design is facilitated.

It should be noted that in the above description, the configuration to output the multiply-accumulate signal representing the multiply-accumulate result (sum of product values) by the time information to the circuit at the subsequent stage has been described. The present technology is not limited thereto, and a multiply-accumulate signal representing a sum of the product values by a voltage may be output as the voltage signal representing the sum of the product values. That is, a configuration to output the voltage of the voltage signal as it is without converting the voltage of the voltage signal into the time information is also possible.

By using the voltage value stored in the analog memory 34, for example, it is possible to easily output the sum of the product values in the respective synapse circuits 8. The voltage of the voltage signal is used for threshold determination, maximum value detection, or the like, for example. Alternatively, the voltage of the voltage signal may be digitized and used. As a matter of course, the voltage signal may be output as a final output value of the arithmetic apparatus 100. Accordingly, it is possible to increase the degree of freedom in circuit design and to improve the affinity with digital circuits.

As described above, in the arithmetic apparatus 100 according to this embodiment, the positive weight charges and the negative weight charges corresponding to the product values of the signal values $x_i$ of the positive and negative weight values and $w_i^-$ are accumulated in the capacitors 13 in the plurality of analog circuits 30 and the voltage signals representing the sum of the product values by the voltage are generated on the basis of the voltages of the capacitors 13. Moreover, the sum totals of the absolute values of the weight values $w_i$ of the respective analog circuits 30 are set to be equal to each other. Accordingly, the distortion of the voltage signal is reduced, and the multiply-accumulate operation can be properly performed. By using the voltage signal in this way, it is possible to simplify the circuit configuration and reduce the power consumption for the multiply-accumulate operation.

As the method of performing the time-axis analog multiply-accumulate operation, a method of further charging the voltage depending on the accumulated charge, converting the voltage into the time width of the time axis, and outputting the multiply-accumulate result is conceivable. In this case, it is necessary to configure a plurality of conversion processes of time-voltage conversion and the voltage-time conversion. Therefore, the circuit is complicated, and the scale of the peripheral circuits can be increased than the analog multiply-accumulate operation circuit serving as a core.

In this embodiment, the voltage representing the multiply-accumulate result, which is the sum of the product values, can be accurately detected by setting the sum totals of the absolute values of the weight values $w_i$ of the respective analog circuits 30 to be equal to each other. For example, in the binary connector configuration, the non-linearity depending on the exponential function in the time interval of the transient response state according to the time constant of the weight can be reduced by setting the total number of weights set in the analog circuit 30 to be constant. Accordingly, it is possible to accurately output the multiply-accumulate result by using a transient response voltage corresponding to the accumulated charges.

The use of the voltage signal makes it unnecessary to provide a logic circuit for time to digital (TD) conversion for storing the time information, a storage circuit such as a buffer memory, a digital to time (DT) conversion circuit for reproducing the time information, and the like. Accordingly, it is possible to greatly simplify the circuit configuration and to sufficiently reduce the power consumed in the multiply-accumulate operation.

Moreover, by expressing the multiply-accumulate signal as the voltage, it is possible to store and read the multiply-accumulate result with a simple configuration. Accordingly, for example, even in a case where the intermediate operations such as normalization and pooling are performed, it is possible to properly perform the arithmetic processing without increasing the peripheral circuits. Moreover, it is possible to reduce the power consumption for the multiply-accumulate operation by simplifying the circuit configuration.

For example, in a case where a multiply-accumulate signal using time information is used as an input/output signal between the steps of a plurality of multiply-accumulate processes and intermediate processes, it is necessary to set all the processing times to be constant. In this embodiment, since the multiply-accumulate result is stored as the voltage, it is possible to easily adjust the processing times. Accordingly, it is possible to increase the degree of freedom in circuit design.

Second Embodiment

An arithmetic apparatus according to a second embodiment of the present technology will be described. In the following description, descriptions of configurations and effects similar to those in the arithmetic apparatus 100 described in the above-mentioned embodiment will be omitted or simplified.

Figure 19:
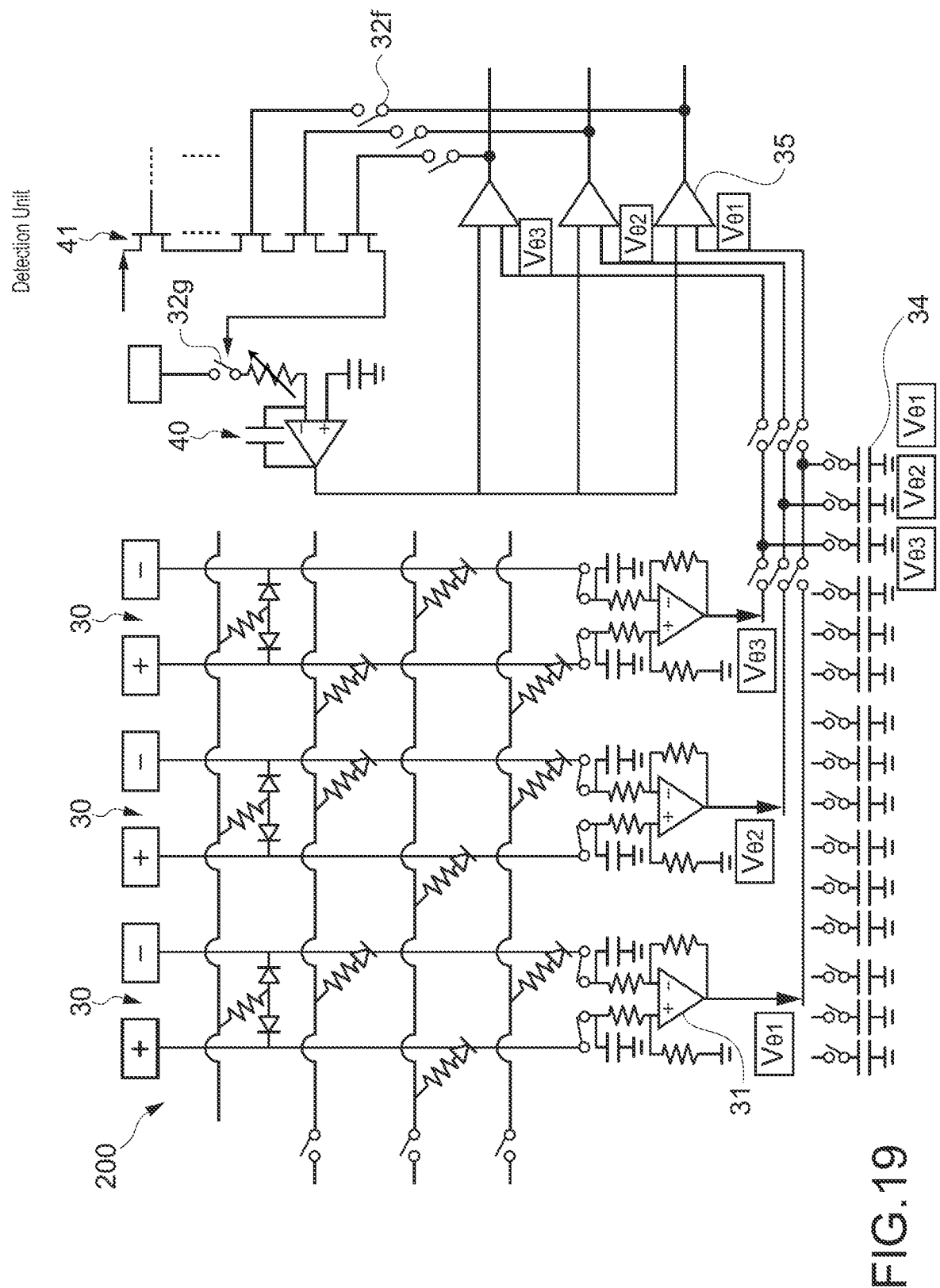
FIG. 19 A schematic diagram showing a configuration example of an arithmetic apparatus according to a second embodiment.

FIG. 19 is a schematic diagram showing a configuration example of an arithmetic apparatus 200 according to the second embodiment. The arithmetic apparatus 200 has a configuration obtained by adding a detection unit 41 to the arithmetic apparatus 100 shown in FIG. 14. In the arithmetic apparatus 200, the detection unit 41 and an integration circuit 40 perform processing of normalizing a multiply-accumulate signal.

The detection unit 41 detects a maximum voltage of voltages of voltage signals generated by each of a plurality of analog circuits 30, as a reference voltage. In this embodiment, a voltage signal having the maximum voltage among the voltage signals is detected on the basis of a multiply-accumulate signal output from a comparator 35 by the detection unit 41.

For example, an OR circuit that calculates a logical sum of a plurality of inputs is used as the detection unit 41. The OR circuit is a circuit that has a gate corresponding to each input and outputs a predetermined transmission signal in a case where OFF signals are input into all inputs. As shown in FIG. 19, the multiply-accumulate signal output from each comparator 35 (inverter) via a switch 32d is input into the detection unit 41. Moreover, the signal output from the detection unit 41 is input into a control terminal of a switch 32g of the integration circuit 40.

The specific configuration of the detection unit 41 is not limited. For example, an OR circuit including cascaded nMOS transistors and pMOS transistors or the like is used as the detection unit 41. In this case, the gate of each MOS transistor is an input terminal of the OR circuit. Moreover, the detection unit 41 can be configured also with an AND circuit that calculates a logical product of the plurality of inputs. In addition, any logic circuit or the like capable of detecting the maximum value of the voltage signal may be used as the detection unit 41.

Moreover, in this embodiment, the integration circuit 40 sets a slope of a ramp voltage on the basis of the reference voltage detected by the detection unit 41. The slope of the ramp voltage is, for example, a rate of change of the ramp voltage described with reference to FIGS. 16 and 17. For example, the integration circuit 40 is configured to store the reference voltage and set the slope of the ramp voltage in accordance with the reference voltage. This point will be described later in detail.

In this embodiment, the maximum value detection processing and normalized output processing are performed as the processing for normalizing the multiply-accumulate signal output from the comparator 35. The maximum value detection processing is processing of detecting a reference voltage serving as a reference of the normalization and the normalization processing is processing of normalizing the multiply-accumulate signal by using the reference voltage. First, the maximum value detection processing is performed, and then the normalization processing is performed.

Figure 20:
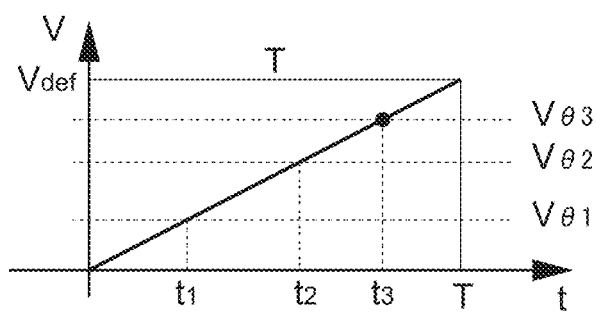
FIG. 20 A graph for describing maximum value detection processing.
Figure 20:
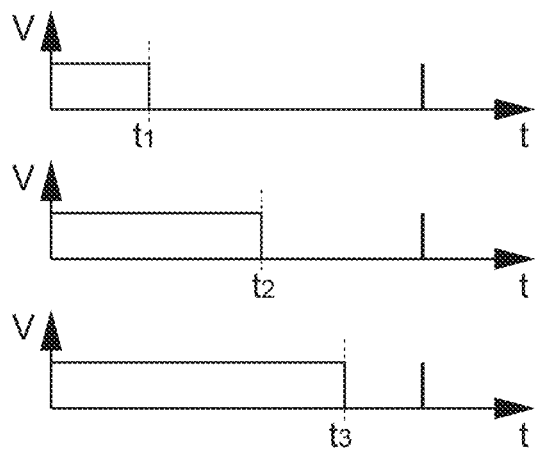

FIG. 20 is a graph for describing the maximum value detection processing. FIG. 20A is a graph showing a ramp voltage in the maximum value detection processing and FIG. 20B is a graph showing an intermediate signal output by threshold determination of the ramp voltage shown in FIG. 20A.

In the maximum value detection processing, a switch 32f is turned on. Moreover, the integration circuit 40 sets the ramp voltage to be a default slope. The default slope is, for example, the slope β described with reference to FIGS. 16 and 17, and a preset value is used, for example. In this embodiment, the default slope corresponds to a first slope.

For example, a signal or the like instructing to output the multiply-accumulate signal is input into the integration circuit 40, and the ramp voltage which varies at the default slope is output from the integration circuit 40. At this time, the switch 32g of the integration circuit 40 is turned on. Voltages of electrical signals output from the respective differential amplifiers 31 are set as threshold values (Vθ1, Vθ2, Vθ3), and the threshold determination is performed in each comparator 35.

As shown in FIG. 20B, a signal in which the ramp voltage having the default slope rises at a timing (t1, t2, t3) at which it exceeds each threshold value is generated, and is inverted by an inverter at the subsequent stage, and the thus obtained intermediate signal is output from the comparator 35. That is, the comparator 35 generates an intermediate signal in which the logical state is switched at a timing at which the ramp voltage having the default slope increases beyond the voltage of the voltage signal. It should be noted that in a case where the slope of the ramp voltage is negative, an intermediate signal is generated at a timing at which the ramp voltage decreases beyond the voltage of the voltage signal.

Each intermediate signal is input into the detection unit 41 via the switch 32f. In the detection unit 41, it is configured such that when a low-level signal is input into a certain gate (input terminal), for example, the corresponding gate is made conductive. The detection unit 41 outputs a transmission signal at a time at which all inputs to be input are completed. For example, in the example shown in FIG. 18, all gates are made conductive when all inputs of three intermediate signals become low level, and the transmission signal is output.

In the example shown in FIG. 20B, t1<t2<t3 is established and the time t3 is the time at which the input of all intermediate signals is completed. When a third intermediate signal drops at time t3, the transmission signal is output from the detection unit 41 and is input into the control terminal of the switch 32g. The switch 32g is turned off and the input line to the integration circuit 40 is cut off.

At this time, the integration circuit 40 stores the output voltage as the reference voltage at a timing at which the input line is cut off. Here, the voltage output at the timing at which the input line is cut off is a value substantially equal to the voltage of the last input voltage signal (threshold value Vθ3 in FIG. 20) and is the maximum voltage value of the voltage signal. That is, the last threshold value Vθ that the ramp voltage having the positive slope has exceeded is a highest voltage among the voltage signals.

Thus, the detection unit 41 detects the reference voltage on the basis of a logical sum of intermediate signals respectively generated by the plurality of analog circuits 30. That is, it can also be said that the detection unit 41 stops the ramp voltage at the input timing of the maximum voltage signal, to thereby detect a value at that time. When the reference voltage is detected, the normalized output processing is performed.

Figure 21:
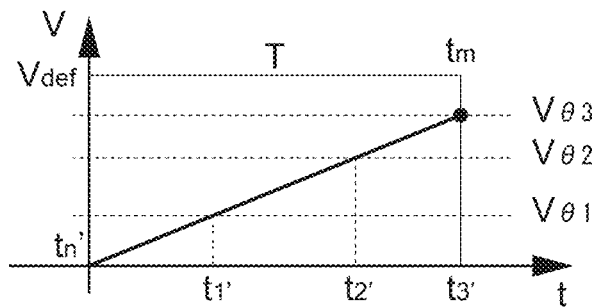
FIG. 21 A graph for describing normalization output processing.
Figure 21:
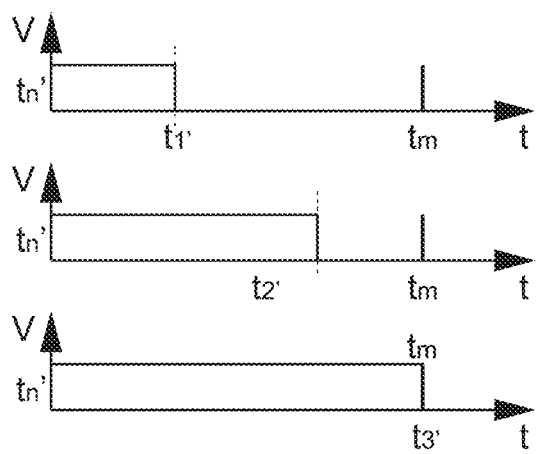

FIG. 21 is a graph for describing the normalized output processing. FIG. 21A is a graph showing a ramp voltage at the time of normalized output processing and FIG. 21B is a graph showing a normalized multiply-accumulate signal output by the threshold determination of the ramp voltage shown in FIG. 21A.

In the normalized output processing, the integration circuit 40 sets the ramp voltage as a normalization slope such that the ramp voltage at the timing at which the output period T ends is equal to the reference voltage. As shown in FIG. 21A, the ramp voltage set to the normalization slope is configured to be 0V at a start timing $t_n'$ of the output period T and be the reference voltage at an end timing $t_m$ of the output period T. Thus, in this embodiment, the settings of the integration circuit are changed such that the maximum voltage (reference voltage) matches the input period T of the next multiply-accumulate period (output period T), and the ramp voltage is output. In this embodiment, the normalization slope corresponds to a second slope.

As shown in FIG. 21B, a signal in which the ramp voltage having the normalization slope rises at a timing (t1', t2', t3') at which it exceeds each threshold value is generated, and is inverted by an inverter at the subsequent stage, and the thus obtained intermediate signal is output from the comparator 35. That is, the comparator 35 generates a multiply-accumulate signal in which the logical state is switched at a timing at which the ramp voltage having the normalization slope increases beyond the voltage of the voltage signal. It should be noted that in a case where the slope of the ramp voltage is negative, the multiply-accumulate signal is generated at a timing at which the ramp voltage decreases beyond the voltage of the voltage signal The slope of the ramp voltage is typically set to be smaller than when the maximum value is detected. Accordingly, the timing at which the ramp voltage reaches each threshold is generally longer.

Moreover, in the normalization slope, the maximum voltage of each voltage signal is set to a threshold value at the end timing of the output period T. That is, the multiply-accumulate signal output from the arithmetic apparatus 100 is normalized (standardized) by using the maximum value of the multiply-accumulate result in each analog circuit 30 as a reference. Thus, in this embodiment, on the basis of the voltage signal generated in each of the plurality of analog circuits, the multiply-accumulate signal normalized is output in the output period T. Accordingly, it is possible to improve the accuracy of each multiply-accumulate signal and achieve a high-precision multiply-accumulate operation.

Thus, a reference value for performing normalization in the voltage dimension can be easily obtained by detecting the reference voltage. Moreover, the slope of the ramp voltage can be easily changed in accordance with the reference voltage. By thus adjusting each parameter in the voltage dimension, it is possible to easily realize a multiply-accumulate signal normalized on the time axis. That is, the normalization in the voltage dimension can be reflected on the time axis by adjusting the slope of the ramp voltage.

The normalized multiply-accumulate signal is output to the circuit at the subsequent stage as appropriate. For example, arithmetic apparatuses 200 are connected in cascade in the same manner as in FIG. 17. Alternatively, a circuit that performs predetermined intermediate processing or the like may be provided between the layers as appropriate. Alternatively, in addition to the cascade connection, a loop connection or the like may be realized.

Figure 22:
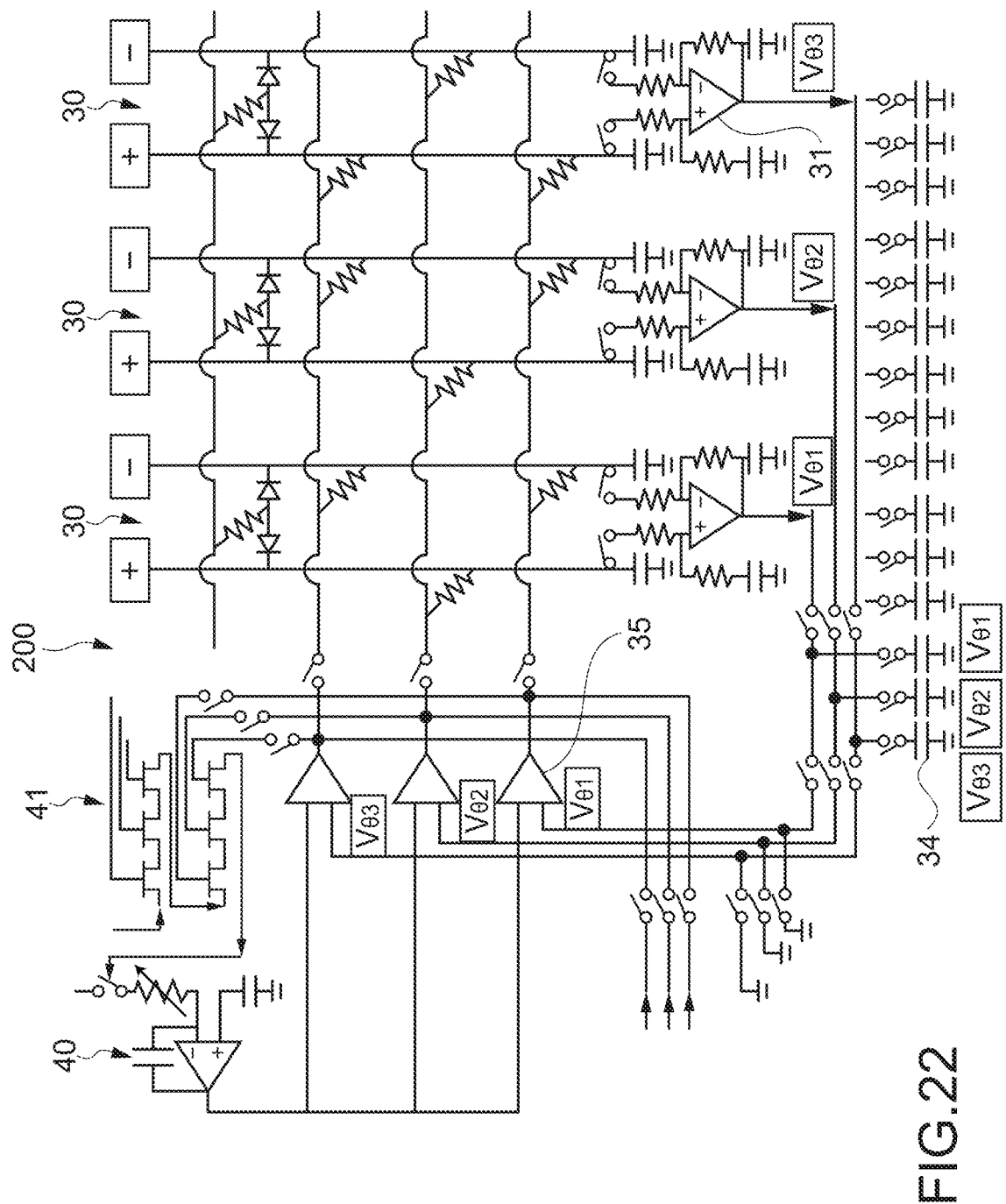
FIG. 22 A schematic diagram showing a connection example of the arithmetic apparatus.

FIG. 22 is a schematic diagram showing a connection example of the arithmetic apparatus 200. In FIG. 22, a loop connection in which the multiply-accumulate signal output from the comparator 35 of the same layer is input into the input signal line is realized. For example, it is possible to processing such as repeatedly performing calculations for a predetermined group of input signals by connecting the arithmetic apparatus 200 in this way.

Moreover, after a plurality of operations, it is also possible to output the output results to another circuit. Accordingly, it is possible to configure a test circuit that tests the accuracy or the like of the repetitive operations. In addition, a connection form including a star-type connection form, back propagation, and the like may be realized.

Other Embodiments

The present technology is not limited to the embodiment described above, and various other embodiments can be realized.

In the above description, the binary connect configuration in which the resistance values of the positive and negative synapse circuits are fixed to the same value has been described. The present technology is not limited to the binary connect, and can be applied even in a case where, for example, multiple values are used as weight values.

For example, a multiply-accumulate operation may be performed by setting two or more values such as $-1$, $-\frac{1}{2}$, $0$, $\frac{1}{2}$, and $1$ as weight values. In such a case, it is possible to reduce the voltage distortion due to the non-linearity and to represent the multiply-accumulate result by the voltage by setting the sum total of the absolute values of the weight values to be constant in each analog circuit.

Moreover, by detecting the differential voltage between the positive weight voltage and the negative weight voltage caused by accumulation of the positive weight and the negative weight, it is possible to represent a multiply-accumulate result having a smaller, substantially linear distortion with respect to the signal value (input value) of the input signal as the voltage. Accordingly, it is possible to avoid the increase in the scale of the peripheral circuits and the like and to extend the application range of the multiply-accumulate operation.

In the present disclosure, "center", "middle", "uniform", "equal", "approximately center", "perpendicular", "parallel", "rectangular", "circular", "coplanar", "line symmetry", and the like are concepts including "substantially center", "substantially middle", "substantially uniform", "substantially equal", "substantially approximately center", and "substantially line symmetry". For example, the states included in a predetermined range (e.g., range of ±10%) with reference to "completely center", "completely middle", "completely uniform", "completely equal", "completely approximately center", "completely perpendicular", "completely parallel", "completely rectangular", "completely circular", "completely coplanar", "completely line symmetry", and the like are also included.

At least two of the features of the present technology described above can also be combined. In other words, various features described in the respective embodiments may be combined discretionarily irrespective of the embodiments. Moreover, the various effects described above are not limitative but are merely illustrative, and other effects may be provided.

It should be noted that the present technology can also take the following configurations.

(1) An arithmetic apparatus, including:
a plurality of input lines into each of which an electrical signal corresponding to an input value is input within a predetermined input period; and
a plurality of multiply-accumulate devices each including
a plurality of multiplication units that each generates, on the basis of the electrical signal input into each of the plurality of input lines, a charge corresponding to a product value obtained by multiplying the input value by a weight value, and
an output unit that accumulates a charge corresponding to the product value generated by each of the plurality of multiplication units and outputs, on the basis of the accumulated charge, a multiply-accumulate signal representing a sum of the product values, in which
the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a ratio of a sum total of the positive weight values to a sum total of absolute values of the weight values is any ratio of 0% to 100%, and
the output unit includes an accumulation unit capable of accumulating each of the positive weight charge and the negative weight charge, generates a voltage signal representing a sum of the product values by a voltage on the basis of the voltage of the accumulation unit, and outputs the multiply-accumulate signal on the basis of the voltage signal, in which
the plurality of multiply-accumulate devices is configured such that sum totals of absolute values of the weight values of the plurality of multiplication units that the plurality of multiply-accumulate devices respectively includes are equal to each other.

(2) The arithmetic apparatus according to (1), in which
the accumulation unit includes a positive weight accumulation unit that accumulates the positive weight charge and a negative weight accumulation unit that accumulates the negative weight charge, and
the output unit generates the voltage signal on the basis of a differential voltage between a positive weight voltage retained by the positive weight accumulation unit and a negative weight voltage retained by the negative weight accumulation unit.

(3) The arithmetic apparatus according to (2), in which
the output unit generates the voltage signal by amplifying the differential voltage at a predetermined amplification factor.

(4) The arithmetic apparatus according to any one of (1) to (3), in which
the output unit outputs the voltage signal representing the sum of the product values by a voltage as the multiply-accumulate signal representing the sum of the product values.

(5) The arithmetic apparatus according to any one of (1) to (4), in which
the output unit converts the voltage signal into the multiply-accumulate signal representing the sum of the product values by using a timing or a pulse width in a predetermined output period.

(6) The arithmetic apparatus according to (5), in which
the output unit outputs the multiply-accumulate signal normalized within the output period on the basis of the voltage signal generated by each of the plurality of multiply-accumulate devices.

(7) The arithmetic apparatus according to (5) or (6), further including
a voltage supply unit that supplies a ramp voltage to the output unit of each of the plurality of multiply-accumulate devices, in which
the output unit outputs the multiply-accumulate signal by performing threshold determination of the ramp voltage by using the voltage of the voltage signal as a threshold value.

(8) The arithmetic apparatus according to (7), in which
the output unit outputs the multiply-accumulate signal on the basis of a timing at which the ramp voltage increases or decreases beyond the voltage of the voltage signal.

(9) The arithmetic apparatus according to (7) or (8), further including
a detection unit that detects a maximum voltage as a reference voltage out of the voltages of the voltage signals respectively generated by the plurality of multiply-accumulate devices, and
the power supply unit sets a slope of the ramp voltage on the basis of the reference voltage.

(10) The arithmetic apparatus according to (9), in which
the power supply unit sets the ramp voltage to a first slope,
the output unit generates an intermediate signal whose logical state switches at a timing at which the ramp voltage of the first slope increases or decreases beyond the voltage of the voltage signal, and
the detection unit detects the reference voltage on the basis of a logical sum or a logical product of the intermediate signals respectively generated by the plurality of multiply-accumulate devices.

(11) The arithmetic apparatus according to (9) or (10), in which
the power supply unit sets the ramp voltage to a second slope such that the ramp voltage is equal to the reference voltage at a timing at which the output period ends, and
the output unit outputs the multiply-accumulate signal whose logical state switches at a timing at which the ramp voltage of the second slope increases or decreases beyond the voltage of the voltage signal.

(12) The arithmetic apparatus according to any one of (1) to (11), in which
the output unit temporarily stores the voltage of the voltage signal.

(13) The arithmetic apparatus according to any one of (1) to (12), in which
the output unit includes an analog memory that retains the voltage of the voltage signal.

(14) The arithmetic apparatus according to any one of (1) to (13), in which
the positive weight value and an absolute value of the negative weight value are fixed to a same value, and
the plurality of multiply-accumulate devices is configured such that the total numbers of multiplication units that the plurality of multiply-accumulate devices respectively includes are equal to each other.

(15) The arithmetic apparatus according to any one of (1) to (14), in which
the input period is set as a period in which input of the electrical signal provides a transition state in which the voltage of the accumulation unit continuously changes.

(16) The arithmetic apparatus according to any one of (1) to (15), in which
the electrical signal has a pulse width corresponding to a period from a timing corresponding to the input value in the input period to an end timing of the input period.

(17) A multiply-accumulate system, including:
a plurality of input lines into each of which an electrical signal corresponding to an input value is input within a predetermined input period;
a plurality of multiply-accumulate devices each including
a plurality of multiplication units that each generates, on the basis of the electrical signal input into each of the plurality of input lines, a charge corresponding to a product value obtained by multiplying the input value by a weight value,
an output unit that accumulates a charge corresponding to the product value generated by each of the plurality of multiplication units and outputs, on the basis of the accumulated charge, a multiply-accumulate signal representing a sum of the product values, in which
the plurality of multiplication units includes at least one of a positive weight multiplication unit that generates a positive weight charge corresponding to a product value obtained by multiplying the input value by a positive weight value or a negative weight multiplication unit that generates a negative weight charge corresponding to a product value obtained by multiplying the input value by a negative weight value, and is configured such that a ratio of a sum total of the positive weight values to a sum total of absolute values of the weight values is any ratio of 0% to 100%, and
the output unit includes an accumulation unit capable of accumulating each of the positive weight charge and the negative weight charge, generates a voltage signal representing a sum of the product values by a voltage on the basis of the voltage of the accumulation unit, and outputs the multiply-accumulate signal on the basis of the voltage signal; and
a network circuit configured by connecting the plurality of multiply-accumulate devices, in which
the plurality of multiply-accumulate devices is configured such that sum totals of absolute values of the weight values of the plurality of multiplication units that the plurality of multiply-accumulate devices respectively includes are equal to each other.

REFERENCE SIGNS LIST 3, 30 analog circuit
6, 6a to 6c input signal line
8, 8a, 8b synapse circuit
9 neuron circuit
11 accumulation unit
13, 13a, 13b capacitor
17 resistor
20 comparator
31 differential amplifier
34 analog memory
35 comparator
40 integration circuit
41 detection unit
100, 200 arithmetic apparatus

The invention claimed is:

1. An arithmetic apparatus, comprising:
a plurality of input lines into each of which an electrical signal corresponding to an input value is input within a predetermined input period;
a plurality of multiply-accumulate devices each including
a plurality of multiplication circuits that each generates, on a basis of the electrical signal input into each of the plurality of input lines, a charge corresponding to a product value obtained by multiplying the input value by a weight value, and
an output circuit that accumulates a charge corresponding to the product value generated by each of the plurality of multiplication circuits and outputs, on a basis of the accumulated charge, a multiply-accumulate signal representing a sum of the product values,
in which
the plurality of multiplication circuits includes at least one of a positive weight multiplication circuit that generates a positive weight charge corresponding to a product value obtained by multiplying the input value by a positive weight value or a negative weight multiplication circuit that generates a negative weight charge corresponding to a product value obtained by multiplying the input value by a negative weight value, and is configured such that a ratio of a sum total of the positive weight values to a sum total of absolute values of the weight values is any ratio of 0% to 100%, and
the output circuit includes an accumulation circuit capable of accumulating each of the positive weight charge and the negative weight charge, generates a voltage signal representing a sum of the product values by a voltage on a basis of the voltage of the accumulation circuit, and outputs the multiply-accumulate signal on a basis of the voltage signal, wherein
the plurality of multiply-accumulate devices is configured such that each sum total of absolute values of the weight values of the plurality of multiplication circuits included in each respective multiply-accumulate device is equal to one another, and
a voltage supply circuit that supplies a ramp voltage to the output circuit of each of the plurality of multiply-accumulate devices, wherein
the output circuit outputs the voltage signal as the multiply-accumulate signal by performing threshold determination of the ramp voltage by using the voltage of the voltage signal as a threshold value.

2. The arithmetic apparatus according to claim 1, wherein the accumulation circuit includes a positive weight accumulation circuit that accumulates the positive weight charge and a negative weight accumulation circuit that accumulates the negative weight charge, and
the output circuit generates the voltage signal on a basis of a differential voltage between a positive weight voltage retained by the positive weight accumulation circuit and a negative weight voltage retained by the negative weight accumulation circuit.

3. The arithmetic apparatus according to claim 2, wherein the output circuit generates the voltage signal by amplifying the differential voltage at a predetermined amplification factor.

4. The arithmetic apparatus according to claim 1, wherein the output circuit converts the voltage signal into the multiply-accumulate signal representing the sum of the product values by using a timing or a pulse width in a predetermined output period.

5. The arithmetic apparatus according to claim 4, wherein the output circuit outputs the multiply-accumulate signal normalized within the predetermined output period on a basis of the voltage signal generated by each of the plurality of multiply-accumulate devices.

6. The arithmetic apparatus according to claim 4, wherein the output circuit outputs the multiply-accumulate signal on a basis of a timing at which the ramp voltage increases or decreases beyond the voltage of the voltage signal.

7. The arithmetic apparatus according to claim 4, further comprising
a detection circuit that detects a maximum voltage as a reference voltage out of the voltages of the voltage signals respectively generated by the plurality of multiply-accumulate devices, and
the integration circuit sets a slope of the ramp voltage on a basis of the reference voltage.

8. The arithmetic apparatus according to claim 7, wherein the integration circuit sets the ramp voltage to a first slope,
the output circuit generates an intermediate signal whose logical state switches at a timing at which the ramp voltage of the first slope increases or decreases beyond the voltage of the voltage signal, and
the detection circuit detects the reference voltage on a basis of a logical sum or a logical product of the intermediate signals respectively generated by the plurality of multiply-accumulate devices.

9. The arithmetic apparatus according to claim 7, wherein the integration circuit sets the ramp voltage to a second slope such that the ramp voltage is equal to the reference voltage at a timing at which the predetermined output period ends, and
the output circuit outputs the multiply-accumulate signal whose logical state switches at a timing at which the ramp voltage of the second slope increases or decreases beyond the voltage of the voltage signal.

10. The arithmetic apparatus according to claim 1, wherein
the output circuit temporarily stores the voltage of the voltage signal.

11. The arithmetic apparatus according to claim 1, wherein
the output circuit includes an analog memory that retains the voltage of the voltage signal.

12. The arithmetic apparatus according to claim 1, wherein
the positive weight value and an absolute value of the negative weight value are fixed to a same value, and
the plurality of multiply-accumulate devices is configured such that the total numbers of multiplication circuits that the plurality of multiply-accumulate devices respectively includes are equal to each other.

13. The arithmetic apparatus according to claim 12, wherein
the predetermined input period is set as a period in which input of the electrical signal provides a transition state in which the voltage of the accumulation circuit continuously changes.

14. The arithmetic apparatus according to claim 1, wherein
the electrical signal has a pulse width corresponding to a period from a timing corresponding to the input value in the predetermined input period to an end timing of the predetermined input period.

15. A multiply-accumulate system, comprising:
a plurality of input lines into each of which an electrical signal corresponding to an input value is input within a predetermined input period;
a plurality of multiply-accumulate devices each including
a plurality of multiplication circuits that each generates, on a basis of the electrical signal input into each of the plurality of input lines, a charge corresponding to a product value obtained by multiplying the input value by a weight value,
an output circuit that accumulates a charge corresponding to the product value generated by each of the plurality of multiplication circuits and outputs, on a basis of the accumulated charge, a multiply-accumulate signal representing a sum of the product values, in which
the plurality of multiplication circuits includes at least one of a positive weight multiplication circuit that generates a positive weight charge corresponding to a product value obtained by multiplying the input value by a positive weight value or a negative weight multiplication circuit that generates a negative weight charge corresponding to a product value obtained by multiplying the input value by a negative weight value, and is configured such that a ratio of a sum total of the positive weight values to a sum total of absolute values of the weight values is any ratio of 0% to 100%, and
the output circuit includes an accumulation circuit capable of accumulating each of the positive weight charge and the negative weight charge, generates a voltage signal representing a sum of the product values by a voltage on a basis of the voltage of the accumulation circuit, and outputs the multiply-accumulate signal on a basis of the voltage signal;
a network circuit configured by connecting the plurality of multiply-accumulate devices; and
a voltage supply circuit that supplies a ramp voltage to the output circuit of each of the plurality of multiply-accumulate devices, wherein
the output circuit outputs the voltage signal as the multiply-accumulate signal by performing threshold determination of the ramp voltage by using the voltage of the voltage signal as a threshold value, and
the plurality of multiply-accumulate devices is configured such that each sum total of absolute values of the weight values of the plurality of multiplication circuits included in each respective multiply-accumulate device is equal to one another.

* * * * *